US010642242B2

(12) United States Patent
Webber et al.

(10) Patent No.: US 10,642,242 B2
(45) Date of Patent: May 5, 2020

(54) ASSEMBLY COMPRISING AN EMERGENCY RELEASE SYSTEM AND A DIAGNOSIS SYSTEM TO VERIFY THE OPERATION OF THE EMERGENCY RELEASE SYSTEM

(71) Applicant: KLAW Products Limited, Westbury, Wiltshire (GB)

(72) Inventors: Anthony Webber, Westbury (GB); Julian Fairman, Westbury (GB)

(73) Assignee: KLAW Products Limited, Westbury, Wiltshire (GB)

( * ) Notice: Subject to any disclaimer, the term of this patent is extended or adjusted under 35 U.S.C. 154(b) by 73 days.

(21) Appl. No.: 15/560,996

(22) PCT Filed: Mar. 24, 2016

(86) PCT No.: PCT/GB2016/050840
§ 371 (c)(1),
(2) Date: Sep. 22, 2017

(87) PCT Pub. No.: WO2016/151330
PCT Pub. Date: Sep. 29, 2016

(65) Prior Publication Data
US 2018/0052436 A1 Feb. 22, 2018

(30) Foreign Application Priority Data
Mar. 26, 2015 (GB) .................................. 1505203.8

(51) Int. Cl.
*G05B 19/042* (2006.01)
*F16L 55/10* (2006.01)
(52) U.S. Cl.
CPC ...... *G05B 19/0428* (2013.01); *F16L 55/1007* (2013.01); *F16L 55/1022* (2013.01)
(58) Field of Classification Search
CPC .......................... F16L 55/1022; F16L 55/1007
See application file for complete search history.

(56) References Cited

U.S. PATENT DOCUMENTS

2007/0017738 A1 1/2007 Truss
2007/0282457 A1 12/2007 Araki
(Continued)

FOREIGN PATENT DOCUMENTS

EP 2 808 242 A1 12/2014
JP 2014-223939 A 12/2014

OTHER PUBLICATIONS

ESD Arrangements & Linked Ship/Shore Systems for Liquefied Gas Carriers, SIGTTO, Witherby Seamanship International Ltd., 61 pages (2009).
(Continued)

*Primary Examiner* — Reinaldo Sanchez-Medina
*Assistant Examiner* — Nicole Gardner
(74) *Attorney, Agent, or Firm* — Foley & Lardner LLP

(57) ABSTRACT

There is provided an assembly for transferring matter between first and second objects separated by a distance, either or both of the first and second objects being movable to increase or decrease the distance therebetween. The assembly comprises: a conduit providing a medium for transferring matter between the first and second objects, the conduit comprising first and second conduit sections, the first conduit section being operatively connectable to the first object, the second conduit section being operatively connectable to the second object; an emergency release system including an emergency release coupling, the emergency release coupling including first and second coupling portions (10,12), the first coupling portion (10) operatively coupled to the first conduit section, the second coupling portion (12) operatively coupled to the second conduit section, the first and second coupling portions (10,12) configured to be selectively connectable and separable to permit selective coupling and separation of the first and second conduit sections; and a diagnostic system programmed to
(Continued)

perform a proof test to assess the operational capability of the emergency release system prior to the operation of the conduit to transfer matter between the first and second objects.

14 Claims, 9 Drawing Sheets

(56) References Cited

U.S. PATENT DOCUMENTS

| | | |
|---|---|---|
| 2009/0293969 A1 | 12/2009 | Le Devehat et al. |
| 2010/0263389 A1 | 10/2010 | Bryngelson et al. |
| 2010/0293389 A1 | 11/2010 | Harris |
| 2014/0116515 A1 | 5/2014 | Konishi |

OTHER PUBLICATIONS

International Search Report and Written Opinion, PCT/GB2016/050840, KLAW Products Limited, 13 pages (dated Aug. 26, 2016).

ASSEMBLY COMPRISING AN EMERGENCY RELEASE SYSTEM AND A DIAGNOSIS SYSTEM TO VERIFY THE OPERATION OF THE EMERGENCY RELEASE SYSTEM

CROSS-REFERENCE TO RELATED APPLICATIONS

This application is a U.S. national stage of PCT/GB2016/050840, filed Mar. 24, 2016, which claims the benefit of and priority to Great Britain Patent Application No. 1505203.8, filed Mar. 26, 2015, the entire contents of each of which are incorporated herein by reference.

BACKGROUND

This invention relates to an assembly for transferring matter between first and second objects separated by a distance and to an emergency release coupling.

It is known to use an emergency release coupling with separable coupling portions in order to selectively connect and separate different conduit sections belonging to a conduit that is used to transfer matter between first and second objects separated by a distance.

SUMMARY

According to a first aspect of the invention, there is provided an assembly for transferring matter between first and second objects separated by a distance, either or both of the first and second objects being movable to increase or decrease the distance therebetween, the assembly comprising:
 a conduit providing a medium for transferring matter between the first and second objects, the conduit comprising first and second conduit sections, the first conduit section being operatively connectable to the first object, the second conduit section being operatively connectable to the second object;
 an emergency release system including an emergency release coupling, the emergency release coupling including first and second coupling portions, the first coupling portion operatively coupled to the first conduit section, the second coupling portion operatively coupled to the second conduit section, the first and second coupling portions configured to be selectively connectable and separable to permit selective coupling and separation of the first and second conduit sections; and
 a diagnostic system programmed to perform a proof test to assess the operational capability of the emergency release system prior to the operation of the conduit to transfer matter between the first and second objects.

The provision of the diagnostic system in the assembly of the invention permits the performance of a proof test to confirm the proper operation of the emergency release system prior to the operation of the conduit to transfer matter between the first and second objects. The ability to confirm the proper operation of the emergency release system in this manner greatly reduces the risk of adverse effects resulting from the failure of the emergency release system during the operation of the conduit to transfer matter between the first and second objects. Examples of such adverse effects includes increased operational costs and detrimental environmental impact due to spillage/loss of the matter from the conduit.

The diagnostic system may be programmed to perform a proof test to assess the operational capability of the emergency release system prior to each of a plurality of operations of the conduit to transfer matter between the first and second objects. This ensures the safe and reliable operation of the assembly, particularly under circumstances in which there is a regular change in the operator overseeing the operation of the assembly.

The emergency release system may be maintained, during the proof test, in a first safe state to de-energise the emergency release coupling and keep the first and second coupling portions connected to each other. Maintaining the emergency release system in the first safe state during the proof test prevents uncontrolled spurious separation of the first and second coupling portions.

The first safe state may include one or more of:
 de-energisation of a power source configured to enable charging of a stored energy source for an actuator operable to initiate the separation of the first and second coupling portions;
 de-energisation of a heating system arranged to control the temperature of the emergency release coupling;
 de-energisation of one or more solenoid valves switchable to control the operation of the emergency release system;
 maintaining a stored energy source in a fully charged state, wherein the stored energy source is for an actuator operable to initiate the separation of the first and second coupling portions;
 maintaining closed an activation element, which is switchable to open to initiate the separation of the first and second coupling portions;
 maintaining open a blocking element, which is switchable to close to configure the first and second coupling portions to block the flow of matter therethrough.

The proof test may include one or more of:
 a test of an actuator to simulate the separation of the first and second coupling portions, wherein the actuator is normally operable to initiate the separation of the first and second coupling portions but configured during the proof test to inhibit actual separation of the first and second coupling portions;
 a test of the integrity and/or status of one or more solenoid valves switchable to control the operation of the emergency release system;
 a test of the status of the or each distance sensor configured to measure, in use, the distance between the first and second objects;
 a test of the status of the or each sensor configured to measure a property of the emergency release system;
 a test of the status of a heating system arranged to control the temperature of the emergency release coupling;
 a test of the status of a stored energy source for an actuator operable to initiate the separation of the first and second coupling portions;
 a test of the status of a pump configured to charge a stored energy source for an actuator operable to initiate the separation of the first and second coupling portions;
 a test of the integrity and/or status of a control system programmed to operate the emergency release system.

According to a second aspect of the invention, there is provided an assembly for transferring matter between first and second objects separated by a distance, either or both of the first and second objects being movable to increase or decrease the distance therebetween, the assembly comprising:

a conduit providing a medium for transferring matter between the first and second objects, the conduit comprising first and second conduit sections, the first conduit section being operatively connectable to the first object, the second conduit section being operatively connectable to the second object;

an emergency release coupling including first and second coupling portions, the first coupling portion operatively coupled to the first conduit section, the second coupling portion operatively coupled to the second conduit section, the first and second coupling portions configured to be selectively connectable and separable to permit selective coupling and separation of the first and second conduit sections; and a safety instrumented function including a sensor, a logic solver and a final element, the final element being in the form of the emergency release coupling, wherein the logic solver is programmed to activate the final element in response to detection of a fault that inhibits the operation of the conduit to safely transfer matter between the first and second objects so as to:

initiate a first safe state to de-energise the emergency release coupling and keep the first and second coupling portions connected to each other; or initiate a second safe state to cause separation of the first and second coupling portions.

Initiation of either of the first and second safe states in response to the fault removes the risk of adverse effects resulting from an unsafe operation of the conduit to transfer matter between the first and second objects. As mentioned above, examples of such adverse effects includes increased operational costs and detrimental environmental impact due to spillage/loss of the matter from the conduit. In addition initiation of the first safe state in response to the fault permits a quick restart of the operation of the conduit to safely transfer matter between the first and second objects after the fault has been removed.

The provision of the safety instrumented system in the assembly of the invention therefore permits the assembly to reliably achieve a safe state in the event of the fault, thus reducing the operational risk to a level that enables the assembly to achieve a desired Safety Integrity Level (SIL) rating. In particular, the safety instrumented function of the assembly of the invention is designed to achieve a SIL2 rating.

The first safe state may include one or more of:
de-energisation of a power source configured to enable charging of a stored energy source for an actuator operable to initiate the separation of the first and second coupling portions;
de-energisation of a heating system arranged to control the temperature of the emergency release coupling;
de-energisation of one or more solenoid valves switchable to control the operation of the emergency release coupling;
maintaining a stored energy source in a fully charged state, wherein the stored energy source is for an actuator operable to initiate the separation of the first and second coupling portions;
maintaining closed an activation element, which is switchable to open to initiate the separation of the first and second coupling portions;
maintaining open a blocking element, which is switchable to close to configure the first and second coupling portions to block the flow of matter therethrough.

In embodiments of the invention, the logic solver may be programmed to selectively activate the final element to initiate the second safe state after the first safe state is initiated. By ensuring that the second safe state is initiated after the first safe state is initiated, the level of operational risk associated with the operation of assembly to transfer matter between the first and second objects is further reduced.

In such embodiments, the logic solver may be programmed to selectively activate the final element to initiate the second safe state following a time delay after the first safe state is initiated.

In further embodiments of the invention, the sensor may be a distance sensor configured to measure, in use, the distance between the first and second objects, and the fault may include the distance between the first and second objects exceeding a predefined safety distance threshold. This allows the safety instrumented function to initiate either of the first and second safe states in response to an undesirable increase in distance between the first and second objects.

In such embodiments, the logic solver may be programmed to selectively activate the final element to: initiate the first safe state when the distance between the first and second objects exceeds a first safety distance threshold; and initiate the second safe state to cause separation of the first and second coupling portions after the first safe state is initiated and when the distance between the first and second objects exceeds a second safety distance threshold that is larger than the first safety distance threshold.

The safety instrumented function may be configured to permit initiation of the second safe state on demand independently of the sensor. This allows the operator to manually initiate the second safe state, thus further reducing the level of operational risk associated with the operation of assembly to transfer matter between the first and second objects.

The fault may include one or more of:
the failure or fault operating condition of an assembly component;
the failure or fault operating condition of each of a plurality of assembly components arranged in a redundant configuration.

The fault may include one or more of:
the failure or fault operating condition of one or more of a plurality of assembly components arranged in a redundant configuration;
the failure or fault operating condition of the majority of a plurality of assembly components arranged in a redundant configuration.

The SIL rating of the assembly is enhanced through the safety instrumented system utilising the redundant configuration of the assembly components as a basis for activating the final element. More specifically, the latter involves the initiation of the safe state only when more than one redundant assembly component has failed or experienced a fault operating condition, since the operation of the conduit to safely transfer matter between the first and second objects can still be carried out when at least one of the redundant assembly components has not failed or experienced a fault operating condition.

The or each assembly component may be or may include:
the emergency release coupling;
the sensor;
a power supply configured to power an assembly component;
a stored energy source for an actuator operable to initiate the separation of the first and second coupling portions;

a pump configured to charge a stored energy source for an actuator operable to initiate the separation of the first and second coupling portions;

a heating system arranged to control the temperature of the emergency release coupling;

a control system programmed to monitor and/or operate the emergency release coupling.

According to a third aspect of the invention, there is provided an emergency release coupling, for releasably coupling first and second conduit sections to each other, comprising:

first and second coupling portions, the first coupling portion operatively coupleable to the first conduit section, the second coupling portion operatively coupleable to the second conduit section, the first and second coupling portions configured to be selectively connectable and separable to permit selective coupling and separation of the first and second conduit sections; and at least one sensor to measure the temperature of the emergency release coupling.

The configuration of the emergency release coupling in this manner permits direct and accurate monitoring of the temperature of the emergency release coupling.

According to a fourth aspect of the invention, there is provided an emergency release coupling, for releasably coupling first and second conduit sections to each other, comprising:

first and second coupling portions, the first coupling portion operatively coupleable to the first conduit section, the second coupling portion operatively coupleable to the second conduit section, the first and second coupling portions configured to be selectively connectable and separable to permit selective coupling and separation of the first and second conduit sections;

a coupling mechanism arranged to releasably couple the first and second coupling portions to each other;

an actuator operable to apply a mechanical force to the coupling mechanism so as to initiate the separation of the first and second coupling portions;

at least one linkage mechanism arranged to be releasably located in a linking position to couple the actuator and the coupling mechanism to each other, wherein the actuator is allowed to apply the mechanical force to the coupling mechanism only when the or each linkage mechanism is in the linking position; and at least one sensor to monitor the position of the or each linkage mechanism.

The configuration of the emergency release coupling in this manner permits direct and accurate monitoring of the position of the or each linkage mechanism of the emergency release coupling.

In embodiments of the third or fourth aspect of the invention, the or each sensor may be incorporated into the emergency release coupling.

It will be appreciated that features of the embodiments of the first, second, third and fourth aspects of the invention may be used in combination with each other.

A preferred embodiment of the invention will now be described, by way of a non-limiting example, with reference to the accompanying drawings in which:

It will be appreciated that the following description of the preferred embodiment of the invention is intended to illustrate the working of the invention, and the invention may be employed in other applications involving the transfer of matter between first and second objects separated by a distance, whereby either or both of the first and second objects are movable to increase or decrease the distance therebetween.

DETAILED DESCRIPTION

Figure 1:
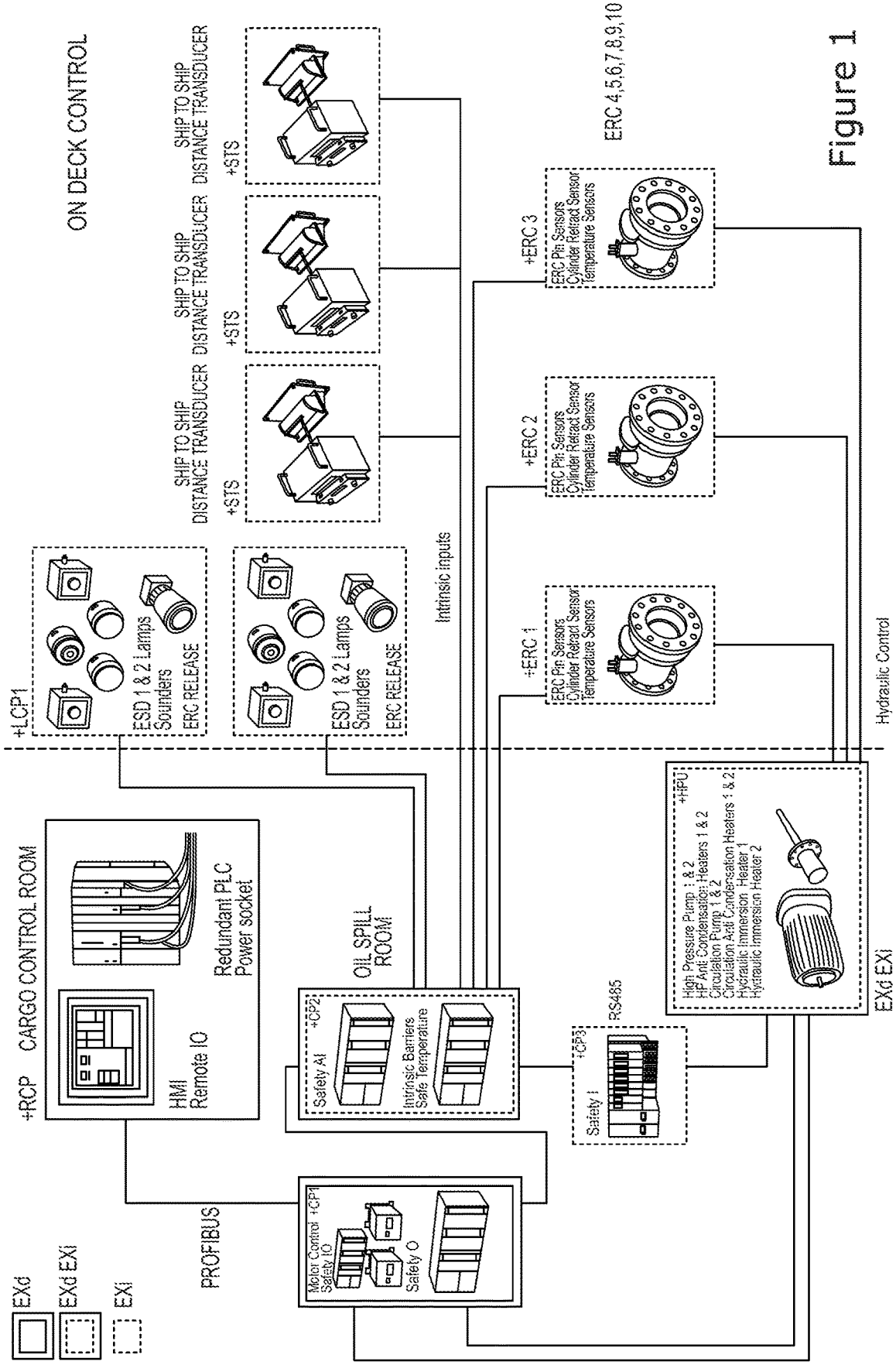
FIG. 1 shows schematically an assembly according to an embodiment of the invention.

An assembly according to an embodiment of the invention is shown schematically in FIG. 1.

In use, the assembly is operated to transfer liquid natural gas (LNG) between first and second ships separated by a distance, whereby either or both of the first and second ships are movable to increase or decrease the distance therebetween. The assembly includes a conduit (not shown) in the form of a transfer hose that permits the transfer of the LNG between the first and second ships. The transfer hose includes first and second hose sections, whereby the first hose section is connected in use to the first ship or an object on the first ship, and whereby the second hose section is connected in use to the second ship or an object on the second ship.

The assembly comprises a plurality of assembly components.

The plurality of assembly components includes a plurality of emergency release couplings (ERC).

Figure 2A:
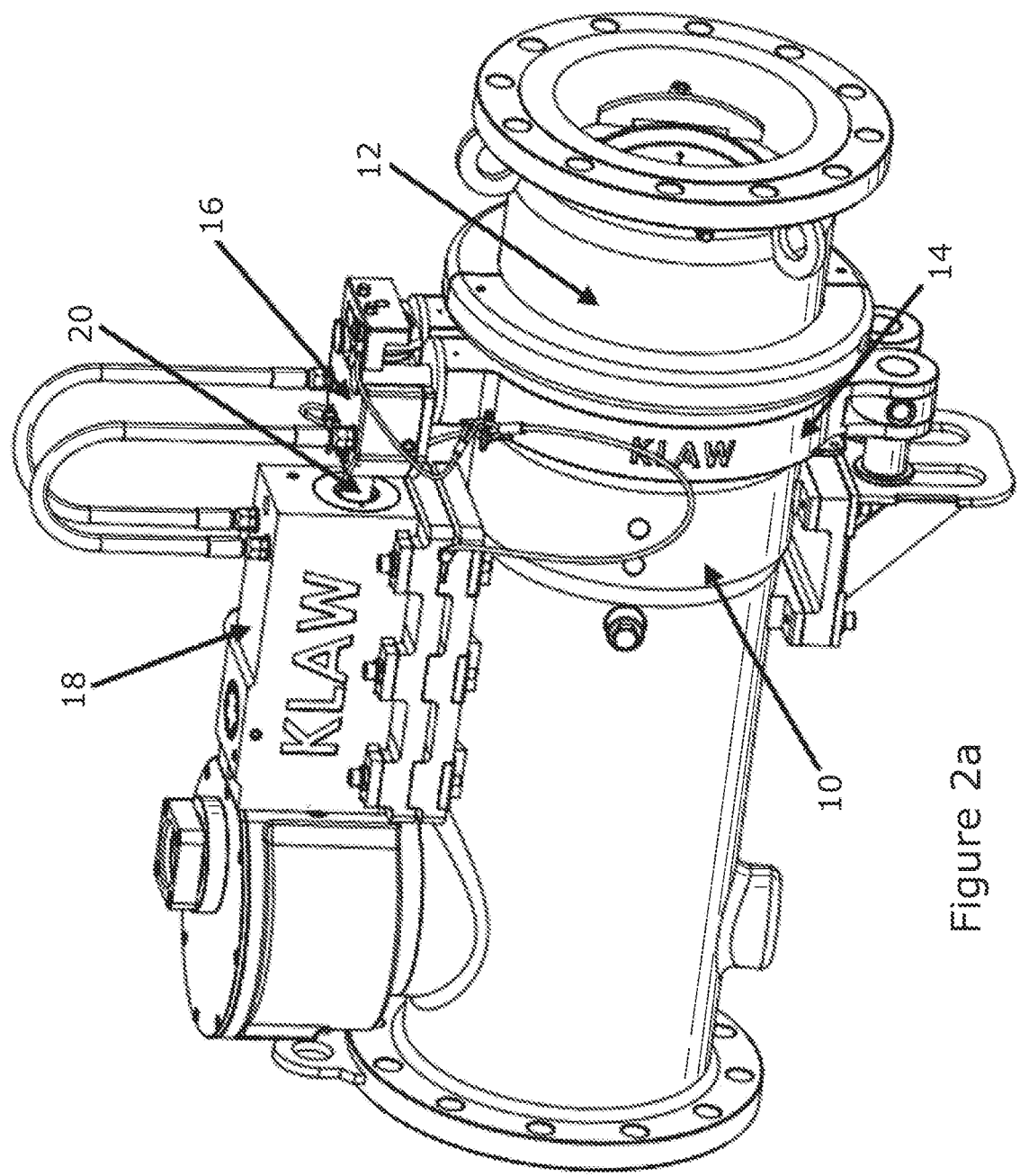
FIGS. 2a and 2b shows schematically an emergency release coupling of the assembly of FIG. 1.
Figure 2B:
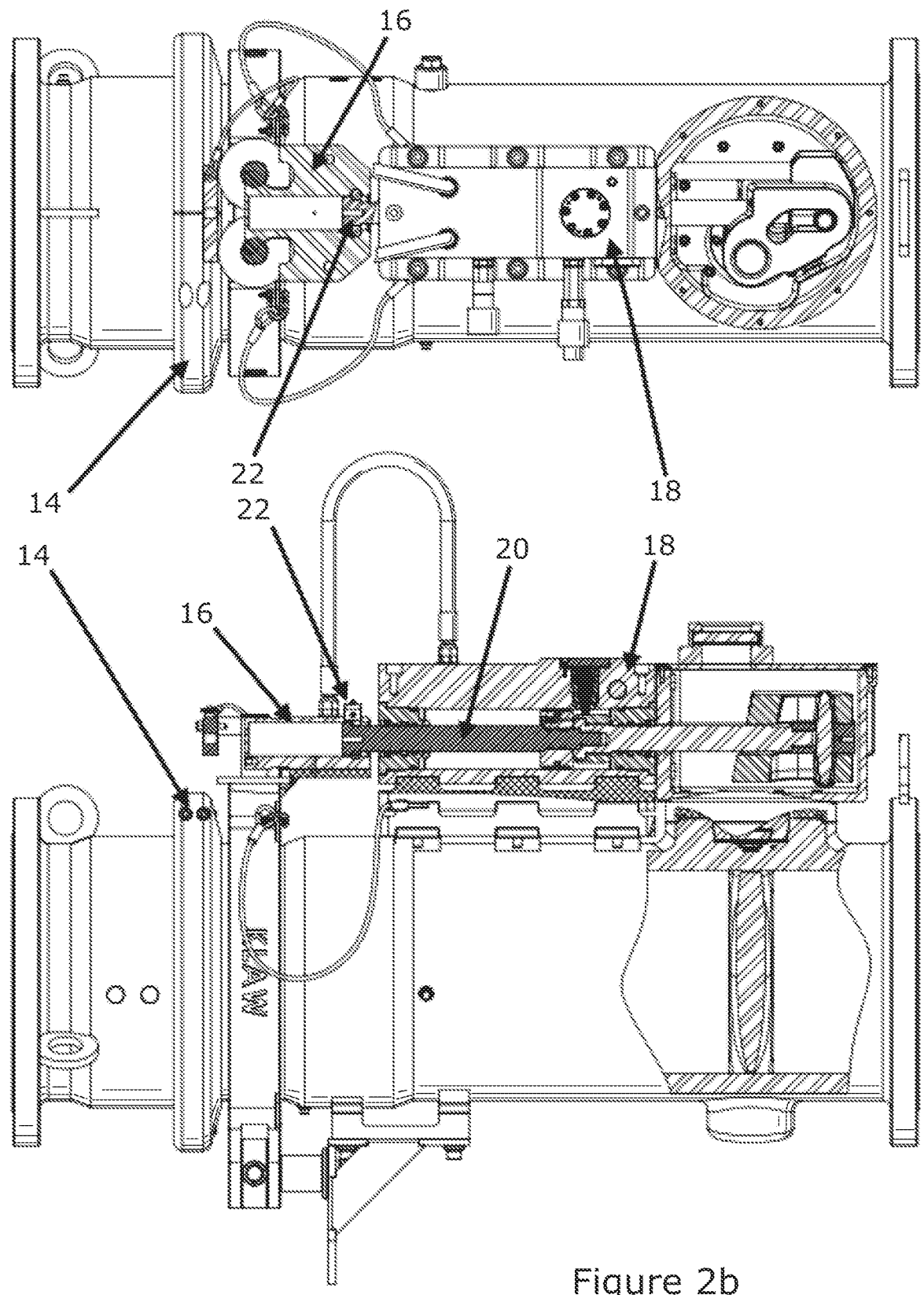

The structure of a given ERC is shown in FIGS. 2a and 2b. Each ERC includes first and second coupling portions 10,12. In use, the first coupling portion 10 is operatively coupled to the first conduit section, and the second coupling portion 12 is operatively coupled to the second conduit section. The first and second coupling portions 10,12 are configured to be selectively connectable and separable to permit selective coupling and separation of the first and second conduit sections. More particularly, each ERC includes: a coupling mechanism including a collar 14 arranged around the first and second coupling portions 10,12 to releasably couple the first and second coupling portions 10,12 to each other, the coupling mechanism further including a clamp 16 arranged to hold the collar 14 in place around the first and second coupling portions 10,12; and an actuator in the form of a hydraulic cylinder 18 with a piston 20 and an accumulator. The piston 20 of each hydraulic cylinder 18 is movable to apply a mechanical force to the clamp 16 to release the collar 14 so as to initiate separation of the first and second coupling portions 10,12.

Each ERC further includes a linkage mechanism in the form of a firing pin 22 arranged to be releasably located in a linking position to couple the piston 20 and the clamp 16 to each other. The piston 20 is permitted to apply a mechanical force to the clamp 16 only when the corresponding firing pin 22 is in the linking position. Removing the firing pin 22 from the linking position results in the decoupling of the piston 20 and the clamp 16, thus permitting the piston 20 to move freely of the clamp 16 and thereby preventing the piston 20 from applying a mechanical force to the clamp 16.

Each coupling portion 10,12 includes a flow valve member, which when at its valve open position opens the hollow bore of the coupling portion 10,12 to permit the LNG to flow along the hollow bore and therefore along the corresponding hose section. In order to close the hollow bore, the flow valve member is moved from the valve open position to a valve closed position, whereby the flow valve member when at its valve closed position closes the hollow bore of the coupling portion 10,12 to prevent the LNG from flowing along the hollow bore and therefore along the corresponding hose section.

The plurality of assembly components also includes:
- a hydraulic power unit (HPU);
- oil heaters;
- a control system programmed to monitor and operate the ERCs;
- a plurality of sensors to monitor the assembly;
- solenoid valves switchable to control the operation of the ERCs;
- power supplies configured to power the assembly components;

In the embodiment shown, the HPU includes circulating hydraulic pumps to circulate heated oil, which are heated using the oil heaters, through the emergency release couplings and in particular through the hydraulic cylinders. The circulation of the heated oil through the emergency release couplings forms a heat circulation system that provides control over the temperature of the ERCs. The HPU also includes high-pressure hydraulic pumps to charge the accumulators to store energy, which can be later released to actuate the piston 20 in order to apply a mechanical force to the clamp 16.

The control system includes a diagnostic system and a safety instrumented system. The diagnostic system programmed to perform a proof test to assess the operational capability of the ERC prior to the operation of the transfer hose to transfer LNG between the first and second ships. The safety instrumented system includes sensors, a logic solver and final elements. The final elements are in the form of the ERCs. The logic solver is programmed to activate the final elements in response to detection of a fault that inhibits the operation of the transfer hose to safely transfer LNG between the first and second ships so as to initiate a first safe state or a second safe state. The first safe state includes de-energisation of the ERC and keeping the first and second coupling portions 10,12 connected to each other. The second safe state includes separation of the first and second coupling portions 10,12.

The plurality of sensors includes a plurality of distance sensors to measure the distance between the first and second ships.

The configuration and operation of the assembly of FIG. 1 is described in further detail as follows.

Control System

The control system is a redundant safety Programmable Logic Controller (PLC) that is based on the SIMATIC S7-400F/FH Fail-safe fault-tolerant automation system. The setup and test control of the ERCs is performed via a human-machine interface (HMI) and switches located on a remote control panel.

Power Systems

The main power requirements of the assembly are based on a power supply of 440 Vac 60 HZ three-phase three-wire IT System, which is connected to an emergency switchboard that meets the International Convention for the Safety of Life at Sea (SOLAS) requirements for power to be returned within 28 seconds. The control power requirements of the assembly are based on redundant uninterruptible power supplies (UPS) of 230 Vac, which can be provided by the ships.

Safety System

The design of safety related hardware and PLC software of the assembly is in accordance with IEC 61508. The design of the safety instrumented system (SIS) and the development of application software is in accordance with IEC 61511. The safety instrumented functions (SIF) of the SIS are designed to achieve a minimum probability of failure on demand corresponding to a SIL2 rating.

Operator Facilities

An operator of the assembly has a number of interfaces with which to control and monitor the system. The interfaces are listed throughout the description of the preferred embodiment of the invention, and include: the HMI to monitor the control system and change parameters as permitted; and control switches and push buttons on an operator control panel for equipment selection and control.

There are four levels of security used on the HMI as shown in the following table.

| Security Level | Security Log-on Required | Access |
| --- | --- | --- |
| Default | No | Allows an Operator to view all mimic displays and set points. |
| Operator | Yes | Same as Default. In addition, control the less important items of plant. The operator will also be able to acknowledge and reset alarms. |
| Supervisor | Yes | Same as Operator. In addition, a higher level of parameter and control access is allowed. |
| Super user | Yes | Same as Supervisor. In addition, close the application. |

The current security access level will return to the Default level after a task has been completed, or will automatically return to Default security level after 5 minutes. All security levels can only be accessed by on screen password input. Password access will be via automatic prompts on the screen. When a higher level access is required, these will appear automatically.

Where the operator inputs entries via the HMI, the input values are validated by the HMI or PLC to ensure that they are within the expected range, and are valid. Invalid entries are barred from being entered, and an alarm (e.g. as an 'invalid data entry' alarm) is generated by the HMI or PLC (and displayed on the HMI. The PLC continues to use the previous valid value until a new acceptable value is entered. Details of the HMI adjustable set points are listed throughout the description of the preferred embodiment of the invention.

Displays are provided on the HMI to provide an operator with sufficient indication of the operation of the assembly and of alarms.

The HMI monitors the status of the communications link to the PLC. If a loss of communications is detected by a diagnostic system of the HMI, a message will be displayed on the HMI and emphasised by an audible alarm. All communications failures on any of the networks will also be logged on the HMI.

Modes of Operation

A first mode of operation of the assembly is referred to as a 'Proof Test Active' mode, and includes a start-up of the HPU, proof testing and enabling of ERCs. Manual testing can additionally be performed by means of the HMI.

A second mode of operation of the assembly is referred to as a 'System Transfer Actve' mode, and includes the transfer of LNG through the conduit between the first and second ships. All functions in this mode are automatic.

HMI Alarm Handling

A summary of the current alarms is displayed on the HMI, which incorporates facilities to enable the operator to reset all the latched alarms. Alarm handling features on the HMI are described later on in this patent specification.

Safe States

The assembly has been designed to take into account numerous possible faults and to initiate a safe state in response to a fault. In other words, the basis of the design of the assembly is to fail safe.

A first safe state (referred to hereon as ESD-1) minimises the risk of uncontrolled spurious separation of the first and second coupling portions, and includes:
- de-energisation of the ESD-1 relay output to the ship;
- de-energisation of the hydraulic pumps;
- de-energisation of the oil heaters;
- de-energisation of the solenoid output 'fail safe' conditions;
- maintaining each accumulator in a fully charged state;
- maintaining closed an activation valve, which is switchable to close to initiate the separation of the first and second coupling portions;
- maintaining open a blocking valve, which is switchable to open to configure the first and second coupling portions to block the flow of matter therethrough.

A second safe state (referred to hereon as ESD-2) includes separation of the first and second coupling portions.

Safety Input and Output Variables

The distance sensors [STS-01], [STS-02] and [STS-03] are connected to three separate safety input cards to give maximum redundancy and fault tolerance.

A proof test/transfer position switch [415S2] has two channel non-equivalent contacts configured in a SIL2 approved configuration.

Push buttons [LCP-1], [LCP-2], for initiating the second safe state, are single channel Namur inputs on separate cards. Another push button [RCP-1], for initiating the second safe state, has an N/C closed contact and a push button healthy input. Fault monitoring is provided by a safety card.

The solenoid valves SV30a], [SV30b], [SV46a], [SV46b], [SV47a], [SV47b] and ERC valves [SV88-1], [SV89-1], [SV48-1], [SV49-1] are arranged in redundant pairs. Redundant valves are not be connected to the same output card but segregated across two cards for maximum redundancy.

ESD-1 and ESD-2 relay outputs [30K01(E)], [30K02(E)] to each ship are not configured as redundant outputs. Positional feedback is monitored.

Sensor Redundancy

The sensors are configured to have a redundant configuration, and are generally configured as follows:
- a sensor hardware failure is generally categorised as a sensor short circuit/open circuit failure;
- safety critical applications can initiate an ESD-1 if sensor values cannot be assessed because of sensor hardware failure;
- if a redundant Namur sensor or a safety input is being used, the following hardware diagnosis can be achieved:
  - One sensor hardware failure results in an alarm generated on the HMI.
  - Two sensor hardware failure results in an alarm generated on the HMI and an issue of ESD-1 if redundancy is not available and no valid substituted sensor value can be used;
- In the event of two firing pin position sensors experiencing sensor hardware failure, an ESD-1 is not issued, since the positions of the firing pins can be checked visually.

Power Supplies

All input contacts from the power supply are made to standard Siemens input cards. These cards do not have on-board input diagnostics.

All control power supplies 230 Vac or 24 Vdc are in redundant configurations.

The two 230 Vac supplies from the ship are uninterruptable power supplies. Both 230 Vac power supplies are monitored by the system. If a single power supply fails, this will result in an alarm on the HMI. If both power supplies fail, the control system will shut down. ESD-1 output relays are energised to close to initiate an ESD-1 in the event of a total power failure.

The 24 Vdc supplies are arranged in redundant parallel pairs with diode modules. The diode modules have output voltage monitoring and a dry contact output to the PLC. Loss of one 24 Vdc power supply on a given control panel outstation will result in an alarm but no loss of functionality. The 24 Vdc power supplies have been sized to give 100% redundancy. The loss of two redundant 24 Vdc power supplies on the same PLC rack will result in an ESD-1 output to the ship.

One 24 Vdc supply loss to each PLC rack is permitted simultaneously, and will only send an alarm to the HMI as there is no loss of function, only redundancy.

All outstations including the remote control panel will be fed from the UPS and distributed from the local control panel outstation.

The configuration of the assembly permits the 440 Vac power supply to be in a failed state for significantly more than 3 hours. This is because the accumulators can be charged to store the energy needed for activating the ERCs, and under normal operating conditions will retain the pressure charge for an indefinite period. The accumulators provide a 100% redundant solution and therefore are fault tolerant.

The 230 Vac UPS provided from the ships are sized to give more than 3 hours of backup power to the system. They will be supplied from the emergency switchboard, and under normal operating conditions power supply should return to the UPS within the prescribed 28 seconds. The UPS supplies are also 100% redundant.

HPU

The HPU is used in conjunction with the ERCs, and provides a continuous circulating heating system to all connected ERCs and at the same time facilitates the release of the ERCs under different scenarios and conditions. Additionally the HPU is used to reset the ERCs following activation.

The ERCs work at very low temperatures, nominally below −150° C. The circulation of warm oil through the ERCs allows the hydraulic cylinders to remain at working temperature during all environmental and transfer conditions and be available for actuation during an ESD-2 event.

The accumulators store energy in the form of hydraulic oil under pressure. High-pressure hydraulic pumps charge the accumulators up to an operational pressure set at 230 bar. The accumulators will then be ready to release energy to activate the ERCs when an ESD-2 is required. The accumulators are configured so that the availability of one out of two redundant accumulators is required to activate the corresponding ERC. The accumulators are sized to give 100% redundancy for a 10 ERC configuration In the second mode of operation the accumulators are automatically recharged by the HPU, allowing for any internal leakage or losses due to thermal expansion.

The solenoid valves are arranged to prevent spurious release of the ERCs. The solenoid valves are configured so that the operation of one out of two redundant solenoid valves is required to trigger the corresponding action.

Oil Protection Safety Control Loops

The control loop assesses the oil level in the circulating heating system using two digital inputs. Activation of a low' oil alarm level input from an ultrasonic level switch [LS76] results in an alarm on the HMI. Activation of a 'low low' oil alarm level input from another ultrasonic level switch [LS77] inhibits output contactors [130K3(E)], [131K3(E)] of the heaters, stops the circulating hydraulic pumps, and initiates the ESD-1, while a high priority alarm is generated on the HMI.

The ultrasonic level switches when in a healthy non-alarm state provide a true binary input to the PLC. The 'low low' oil alarm level is designed so that it cannot be overridden or inhibited.

The digital signals to the input card is transmitted via interposing relays. The ultrasonic switches are self-diagnostic. A fault in the ultrasonic level switches will always result in a 'fail-safe' false input to the PLC.

A thermocouple [TT4a] is used in a 1 out of 1 voting arrangement for an oil temperature warnings and protection loop, and is used to perform the following actions:

a 'low low' temperature shut down alarm at 20° C. will be generated on the HMI;
a 'low' temperature at 30° C. will generate an alarm on the HMI;
a 'high' temperature at 45° C. will generate an alarm on the HMI;
a 'high high' temperature at 50° C. will generate an alarm on the HMI and inhibit the heaters [H18a], [H18b].

Figure 3:
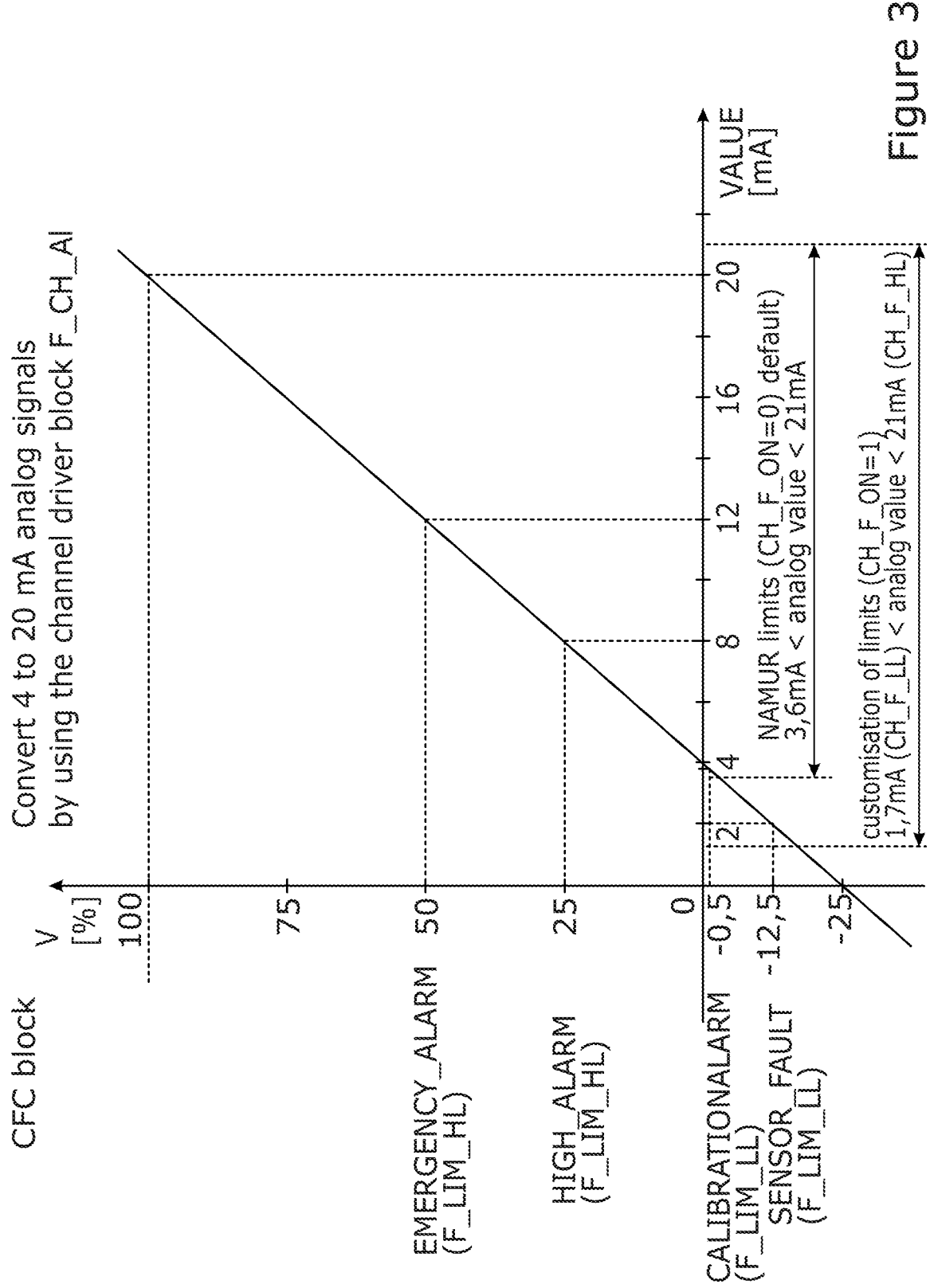
FIG. 3 illustrates, in graphical form, the conversion of a sensor value into a 4-20 mA analogue signal.

The sensor and input card is 4-20 ma; open circuit and short circuit diagnostics are available. In the event of a sensor failure, a diagnostic warning will be initiated on an alarm screen. The Siemens safety card SM326 has the following Namur NE43 fault diagnostics available: a wire break threshold alarm limit is less than 3.6 mA; and a short circuit threshold alarm limit is greater than 21.00 mA. This relationship is shown in FIG. 3.

A diagnostic sensor failure of the thermocouple will result in the temperature sensed by a redundant thermocouple [TT4b] being used as a substitute value in the oil temperature warnings and protection loop. Diagnostic sensor failure of both thermocouples will result in a value of 32000 used as a substitute value in the oil temperature warnings and protection loop resulting in both heaters de-energising.

ESD-1 will not be initiated as the temperature of the ERCs can still be monitored by the redundant thermocouples. However, when the temperature of an active ERC drops below to a 'low' level set-point of 2° C., ESD-1 will be initiated.

Each heater has a built in bi-metallic oil high temperature cut-out set at 60° C., and in series with this, a terminal junction box high temperature cut-out set at 80° C. The output contactors of the heaters may be terminated or inhibited to result in an alarm on the HMI. Each heater will not become active until the corresponding temperature cut-out has been manually reset, which will require a power down.

Oil Heating Control

It is desirable to keep the circulating oil at 40° C., and this function is performed by an oil heating control loop. The control loop is used to monitor and control the temperature of the oil within an oil tank, and consist of the following elements:

the oil heaters [S18a], [S18b], which are the final elements of the control loop.
output contactors of the heaters, which are the interface between the PLC and the final elements;
the thermocouple [TT4b], which is the feedback sensor for the control loop.
the PLC, which is the logic solver for the control loop.
overload protection feedback provided by auxiliary contacts [12Q1(E)] and [12Q2(E)].

The thermocouple is used to assess the temperature of the oil within the oil tank in relation to the desired set-point. The temperature is monitored until a hysteresis of 3° C. (37° C.) below the set-point (40° C.) is observed; the output contactors of the duty oil heaters are then energised. The thermocouple monitors the increase in temperature of the oil within the oil tank; when the temperature of the oil reaches 40° C., the output contactors of the duty oil heaters are de-energised.

If the temperature of the oil is below 30° C., the duty oil heater and a standby oil heater are operated and an alarm is generated on the HMI.

The sensor and input card is 4-20 ma; open circuit and short circuit diagnostics are available. In the event of a sensor failure, a diagnostic warning will be initiated on an alarm screen and the heaters will be de-energised. The Siemens safety card SM326 has the following Namur NE43 fault diagnostics available: a wire break threshold alarm limit is less than 3.6 mA; and a short circuit threshold alarm limit is greater than 21.00 mA. This relationship is shown in FIG. 3.

A diagnostic sensor failure of the thermocouple will result in the temperature sensed by a redundant thermocouple [TT4b] being used as a substitute value in the oil temperature warnings and protection loop. Diagnostic sensor failure of both thermocouples will result in a value of 32000 used as a substitute value in both sensor inputs resulting in both heaters de-energising.

ESD-1 will not be initiated as the temperature of the ERCs can still be monitored by the redundant thermocouples. However, when the temperature of an active ERC drops below a 'low' level set-point of 2° C., ESD-1 will be initiated.

Oil Circulation

The oil is circulated using the circulating hydraulic pumps [M6], [M7]. During transfer operations several control loops are employed to check the availability of the circulating Oil.

Two temperature thermocouples are built in on each ERC to assess its temperature. The temperatures across the ERCs is expected to have an even distribution; the temperatures of the ERCs are constantly monitored to check for any deviation from the expected even temperature distribution.

The temperature of the ERCS are also monitored during the second mode of operation to check for any deviation check for any deviation from the expected even temperature distribution. A low temperature deviation of 5° C. on a given ERC would indicate that there was a lack of oil flow to the given ERC. The low temperature deviation will trigger the annunciation of an alarm, and also trigger another alarm on the HMI to prompt the operator to check a manual filter on the ERC.

A flow meter [FT72] is used to assess the performance of the circulating hydraulic pumps. If the oil flow reduces significantly, the control system will check to see if there are any input alarms from the differential filters on the ERCs. The lack of any filter alarms will trigger the annunciation of an alarm to indicate that the circulating hydraulic pump has a low efficiency, and the standby circulating hydraulic pump will be started. The duty and standby circulating hydraulic pumps are interlocked so the duty circulating hydraulic pump will stop before the standby circulating hydraulic pump will start.

Redundancy for pressure sensors [PT32a] [PT32b] configured to measure the pressures in the circulating hydraulic pumps are made available during the second mode of operation by checking for any pressure deviation when compared to pressure sensors [PT32c] and [PT32d] configured to measure the pressures in hydraulic hoses associated with the circulating hydraulic pumps. A pressure deviation above a specific threshold, e.g. 20 bar, will generate an alarm on the HMI. Both sets of pressure values will be available to view on screen; the operator is able to use a supervisory password screen to disable a sensor reading, thus causing the disabled sensor to be discounted by the software.

The hydraulic hose pressure sensors are arranged in a redundant configuration. If a Namur sensor failure is detected on either hydraulic hose pressure sensor during the second mode of operation, the control system will automatically substitute the known good value from the other hydraulic hose pressure sensor. If both hydraulic hose pressure sensors have diagnostic faults, a value of −32000 is used as a substitute value to ensure a fault is generated within the system parameters.

If the oil pressure and flow reduces significantly, the standby circulating hydraulic pump will be started, and an alarm indicating that the circulating hydraulic pump has a low efficiency will be annunciated. If the pressure detected by a circulating hydraulic pump pressure sensor and the hydraulic hose pressure sensors are low and the flow detected by the flow meter is high, an alarm prompting the operator to check the hydraulic hoses will be annunciated and the oil circulation will be suspended. The operator will have the option on the HMI to restart the oil circulation.

The circulating hydraulic pump pressure sensors are typically located behind non-return valves and so their respective detected pressures cannot be compared with each other.

Circulating Pumps Motor Control and Protection Philosophy

When the circulating hydraulic pumps are turned off, an anti-condensation heater is active. The circuit is switched using normally closed contacts on the main contactors [CP-1], [130K1(E)] and [131K1(E)]. Each oil heater is protected using a double pole miniature circuit breaker (MCB) [CP-1], [17F1 (E)] and [CP-1], [17F2 (E)] with trip feedback. A true PLC input is a healthy condition; a false PLC input generates an alarm on the HMI. Anti-condensation heaters are designed as an alarm function.

Motor overload trip feedback from [CP-1], [11Q3 (E)] and [11Q4 (E)] are checked. A true PLC input is a healthy condition; a false PLC input indicates a fault and generates an alarm on the HMI.

A trip condition on the duty circulating hydraulic pump inhibits the duty circulating hydraulic pump from starting. Under such circumstances the standby circulating hydraulic pump will automatically take over the role of the duty circulating hydraulic pump. Failures of both the duty and standby circulating hydraulic pumps will result in an alarm on the HMI.

The above motor control and protection philosophy applies mutatis mutandis to the high pressure hydraulic pumps.

As mentioned earlier, the accumulators store energy in the form of hydraulic oil under pressure. The high-pressure hydraulic pumps charge the accumulators up to an operational pressure set at 230 bar. The accumulators will then be ready to release energy to activate the ERCs when an ESD-2 is required. The accumulators are configured so that the operation of one out of two redundant accumulators is required to activate the corresponding ERC. The accumulators are sized to give 100% redundancy for a 10 ERC configuration. In the second mode of operation the accumulators are automatically recharged by the HPU, allowing for any internal leakage or losses due to thermal expansion. The solenoid valves are arranged to prevent spurious release of the ERCs. The solenoid valves are configured so that the operation of one out of two redundant solenoid valves is required to trigger the corresponding action.

During the transfer of LNG via the conduit, several control loops are active in the high-pressure system.

The accumulators are constantly monitored for leakage during operation. For a given accumulator, its pressure is monitored and re-pressurised by starting a duty high-pressure hydraulic pump if the monitored pressure drops below a set-point, e.g. 180 bar, in the software. There is no associated annunciated alarm.

The accumulator system is designed as a sealed system with minimal expected leakage. If pressure sensors for a given accumulator detect a pressure leakage and if the accumulator requires re-pressurising several times an hour, an alarm is generated on the HMI, e.g. as a 'Accumulator leakage detected. Please perform maintenance' alarm.

If a duty high-pressure hydraulic pump does not start when the corresponding accumulator require re-pressurizing, an alarm is annunciated on the HMI. The standby high-pressure hydraulic pump is then started. In the eventuality of both high-pressure hydraulic pumps failing and both accumulators are charged, a high priority alarm will be generated on the HMI.

If both high-pressure hydraulic pumps fail and one accumulator is below 170 bar, a high priority alarm will be issued on the HMI and an ESD-1 output will be issued to the corresponding ship.

If no increase in pressure is detected over 5 seconds or a reduction of pressure is detected during a charging cycle during the recharging of the accumulator during the second mode of operation, the recharging of the accumulator is halted and an alarm is issued on the HMI. The operator can then accept the alarm to restart the re-pressurising sequence.

Proof Testing

A partial proof test may be conducted prior to each LNG transfer. A 'warm' test at ambient conditions and a 'cold' test is performed in the proof test. The 'warm' test is to be completed no more than 48 hours before commencement of the LNG transfer. The 'cold' test must be performed after cool down but before the LNG transfer.

The partial proof test consists of a test of the hydraulic cylinder to simulate the separation of the first and second coupling portions, whereby the firing pin is removed to configured the hydraulic cylinder during the proof test to inhibit actual separation of the first and second coupling portions;

On start-up all solenoid valves will be tested for functionality to maintain integrity. This sequence is semi-automatic and will report any failures on the HMI.

Any detected fault needs to be repaired to maintain integrity and availability of the assembly.

When an assembly component fails after an LNG transfer has started, the LNG transfer continues until it is completed. Thereafter, the assembly component will then have to be replaced or repaired before the proof test can be completed for subsequent LNG transfers.

During any sequence (including the proof test), when an alarm is generated, the operator is given the option to view the alarm and to accept the alarm. During start up, selecting Proof Testing will re-set all previous out of service requests to active.

If manual control is selected, there are 3 categories that have to be checked. Permissions are steps that are performed at the beginning of the sequence and may not be used further down the sequence. Protections are items that are required, i.e. correct motor overload feedback. Interlocks are present during the whole sequence, and cannot be reset or overcome, i.e., two interlocked motors would not be allowed to run in parallel.

During the second mode of operation manual activation of valves are not allowed.

The use of manual control is only permitted in the pre-proof test section of the sequence, a supervisory password will have to be entered before manual valve or pump actuation is permitted. Before any manual activation of valves, the program will execute a sequence to ensure the firing pins are not present.

In the event of failure of the proof test sequence, there will be a hold and abort. For example, when a filter is blocked during the proof test, the proof test sequence is stopped to allow the operator to change the filter. Thereafter, the sequence cannot complete without a filter check, and so the current step is aborted and a filter check sequence is restarted.

Certain assembly components that are classed as non-essential will be allowed to be removed from service for one transfer. One of the following items may be taken out of service with the use of a supervisory password in the event of a failure because of their non-critical status:

HPU priming hydraulic pumps in a redundant configuration;

circulating hydraulic pumps in a redundant configuration; the failure of a circulating pump will not affect the LNG transfer until the ERC temperature drops below 2° C.;

hydraulic hose pressure sensors in a redundant configuration, since a sensor failure is permissible due to the availability of a value from the redundant sensor; so we allow one sensor failure and use a value from the redundant sensor;

firing pin position sensors, since they only monitor the position of the firing pin and are not involved in the activation of the ERC;

ERC temperature sensors, since they only monitor the temperature of the ERC and are not involved in controlling the temperature of the ERC.

Safety Instrumented Functions

Figure 4:
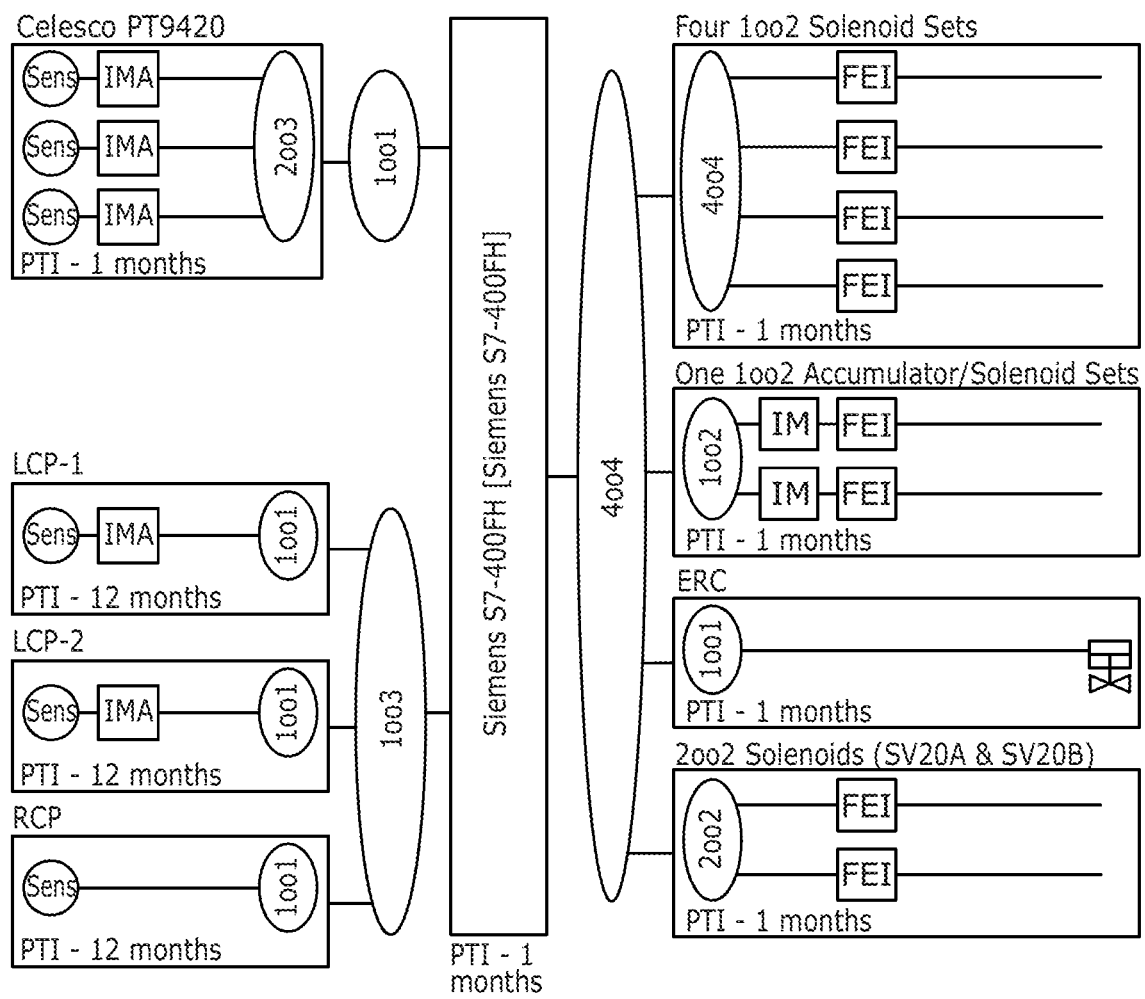
FIG. 4 shows a graphical representation of two safety instrumented functions.
Figure 4:
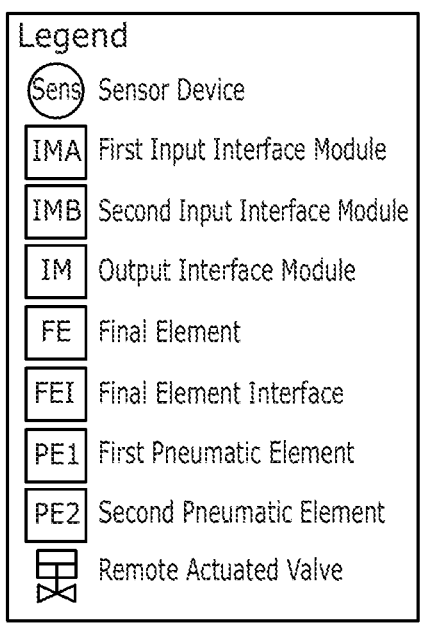

The assembly includes two SIFs, which are an automatic distance separation SIF and an ESD-2 push button 'on demand application' SIF. On-deck push buttons are located on local control panels, one on the port side of the deck and one on the starboard side. There is a third ESD-2 push button located on the remote control panel. The SIFs are shown in FIG. 4.

Both SIFs utilise the Siemens Safety PLC as the logic solver and both use the same final elements, i.e. the emergency release couplings.

The distance sensors are designed to be SIL2 compliant. They are configured in a redundant configuration on separate cards, and are designed so that the safe state is initiated by the logic solver when the fault includes the failure or fault operating condition of two out of the three distance sensors.

During the ESD-2, all fault monitoring is disregarded. If a solenoid valve is shown as being out of position, all solenoid valves will always be actuated on actuation irrespective of start position indicated by feedback.

ERCs

The HPU allows the activation of the ERCs with double flow valve member closure at a safe, identified parting point within the system. The ERCs ensure that the risk of spillage of the LNG out of the conduit is minimised. Upon issuance of an ESD-2 signal, all connected ERCs will be activated in a pre-determined and timed sequence to separate their respective first and second coupling portions.

The ERCs are the final elements of the control System. When demanded to do so, the ERCs are required to separate the conduit sections, which allow the transfer of LNG between the two ships.

As mentioned earlier, each ERC has redundant and high availability sensors to assess its temperature and firing pin position. The activation fully retracted position sensor is not redundant. The redundant sensors follow the standard sensor fault philosophy and alarm generation philosophy. The sensors are all able to detect open circuit fault conditions.

The ERCs are kept at working temperature through the circulation of oil through the emergency release couplings. The oil is circulated through the hydraulic cylinder in the reverse direction to the activation flow in which an orifice in the piston creates a small backpressure that extends the piston. The reverse direction of flow ensures that there is no possibility of uncontrolled spurious separation of the first and second coupling portions.

The temperature sensors for the ERCs have 'low' and low-low' alarm set points. The 'low' alarm set-point, e.g. 8° C. will set an alarm on the HMI, while the low-low' alarm set-point of 2° C. will set an alarm on the HMI and issue an ESD-1 output to the corresponding ship. The temperature sensors are also used to check for any deviation in measured temperatures between temperature sensors of the same ERC and for any deviation in temperatures between the individual ERCs. A deviation of 5° C. between temperature sensors of the same ERCs or between individual ERCs will set an alarm on the HMI.

When there is a temperature deviation above 5° C. between temperature sensors of the same ERC, the operator will have the option to disable one of the temperature sensors via the operator password screen during the second mode of operation. The remaining sensor will then be used, without any redundancy, for alarms set-points and deviation comparisons with other ERCs.

The temperature sensors are classed as a redundant pair and so use the diagnostic failure philosophy. If a temperature sensor fails on card diagnostics during the second mode of operation, the value from the other temperature sensor is used as a substitute value for the remainder of the second mode of operation.

When two acceptable process values are available from the temperature sensors, an average of the two values are used as the mean temperature value for the ERC.

An activation cylinder retract proximity switch is used during an activation to assess if the piston has actuated on demand or has failed to activate. If the piston has failed to activate, a high priority alarm is generated on the HMI screen. The activation cylinder retract proximity switch is not a redundant sensor, and so operates without redundancy when applied to faults and process input. For a process input indicating an out of position piston, the result is the initiation of an ESD-1, and an alarm annunciates on the screen.

A hardware fault will result in an alarm on the HMI screen.

Ship Separation

The objective of the ESD-2 is a safe controlled 'dry break' of the first and second hose sections. The ERCs are activated in sequence to prevent emergency release coupling damage arising from collision or the creation of a potential ignition source.

The signal states to the ship for ESD-2 and ESD-1 will be processed by the Safety PLC program. The enhanced diagnostic capability of the safety cards are used to increase the availability of the ESD-1 Relay.

If the first and second ships drift apart due to, for example, a failure of the mooring system, an ESD-1 will be initiated when a first safety distance threshold (e.g. 4 metres) is exceeded, followed by a timed initiation of an ESD-2 when a second safety distance threshold (e.g. 7 metres) is exceeded. In an emergency situation when the drift far exceeds the second safety distance threshold before the timed initiation of the ESD-2 is completed, an immediate initiation of the ESD-2 is initiated. This ensures that the transfer hose is never fully extended before the ESD-2 is completed.

The ESD-1 will stop the LNG transfer between both ships by stopping the LNG transfer pumps on one ship and by closing the ESD-1 manifold valves on both ships, therefore isolating any possible transfer of LNG. ESD-1 valves will close within 30 seconds as per International Gas Carrier (IGC) code.

The ESD-2 initiation is part of the design of the SIS to achieve a SIL2 rating. It is a requirement that distance sensors are connected before the safety circuit logic can be satisfied and before the LNG transfer operations are commenced. Verification of correct setup will be displayed as a safety matrix. The position is taught on selection of a system ready selector switch.

The piston of each ERC achieves a full stroke within 500 ms when activated.

When two out of the three distance sensors have measured a distance of 4 metres between the two ships, an ESD-1 will be issued to the ship.

Figure 6:
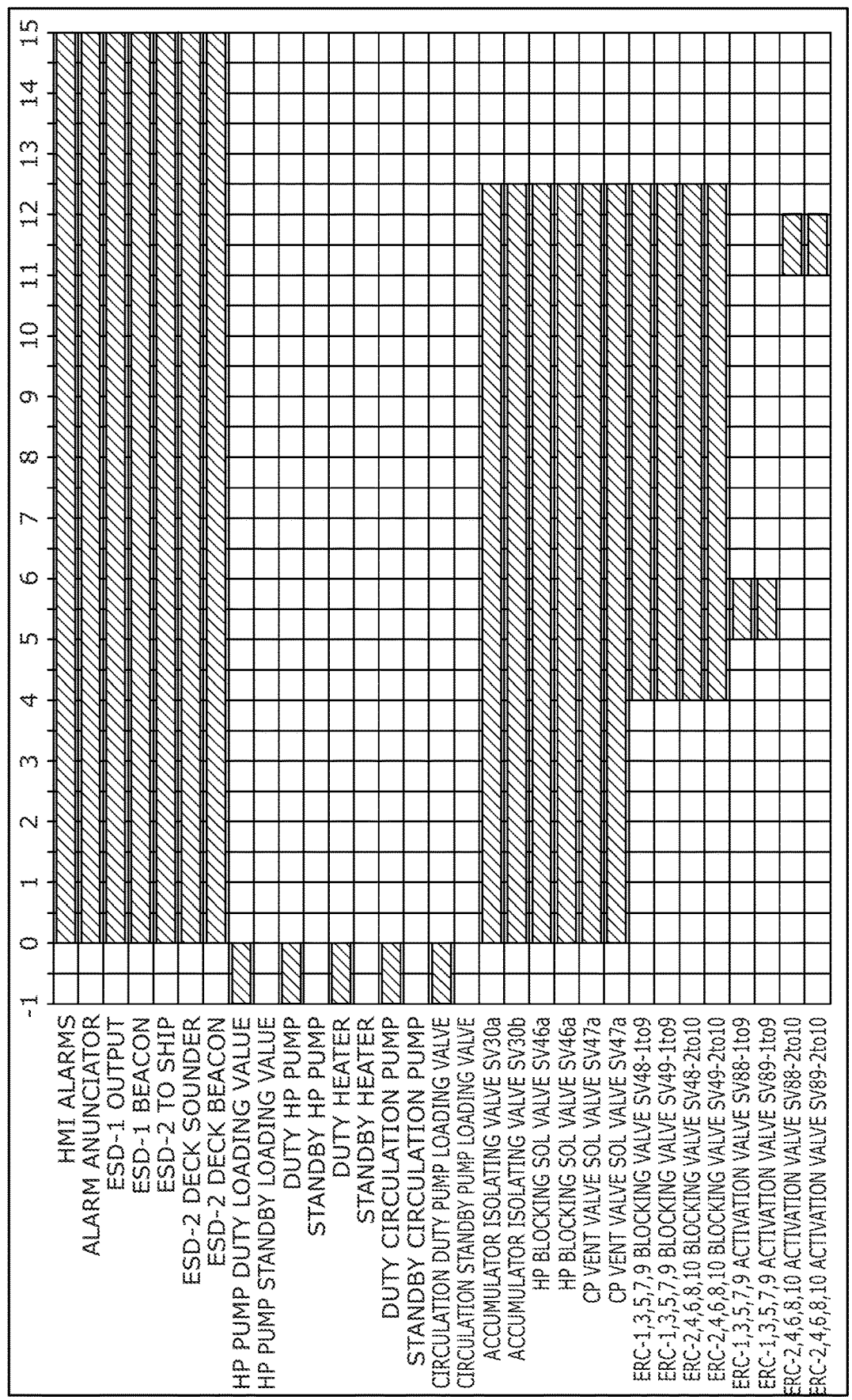
FIGS. 6 to 8 illustrate, in chart form, solenoid valve timing charts.

The design will allow for timed separation in stages at a distance of 7 metres between the two ships. An alarm will annunciate for 5 seconds prior to release; the operator can only mute the siren after the release is complete. The first stage will release ERCs 1, 3, 5, 7 and 9. The corresponding solenoid valves will be held active for 1000 ms and then de-activated. There will be a further 5 second delay before ERCs 2, 4, 6, 8 and 10 are released. The corresponding solenoid valves will now be held active for 1000 ms and then de-activated. The corresponding valve timing chart is shown in FIG. 6.

Figure 7:
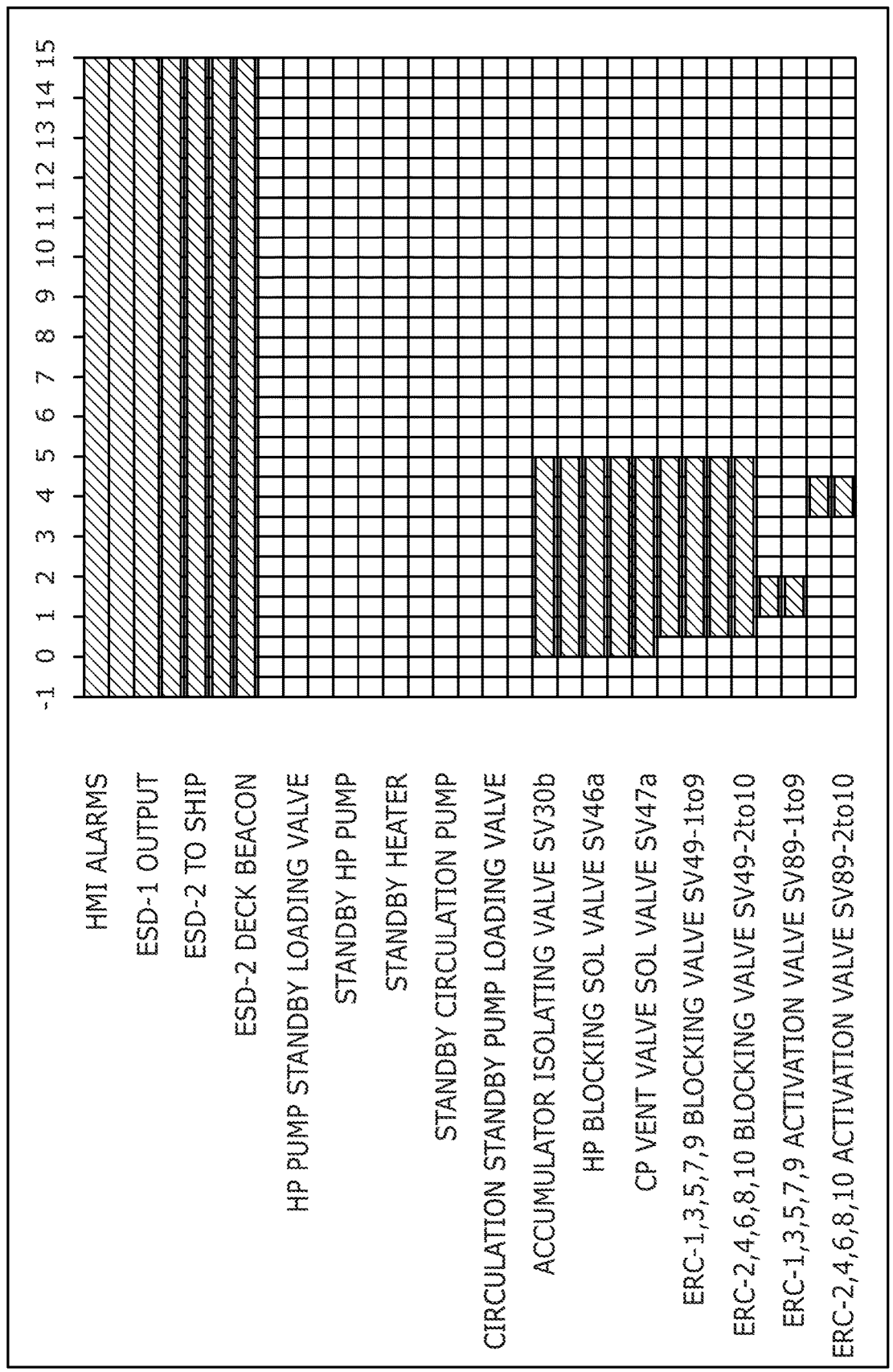

The design will allow for a shortened timed separation in stages at 10 meters. The alarm will already be annunciating. The first stage will release ERCs 1, 3, 5, 7 and 9. The corresponding solenoid valves will be held active for 1000 ms and then de-energised. There will then be a further 500 ms delay before ERCs 2, 4, 6, 8 and 10 are activated. The corresponding solenoid valves will then be held active for 1000 ms, then de-energised. The corresponding valve timing chart is shown in FIG. 7.

Figure 8:
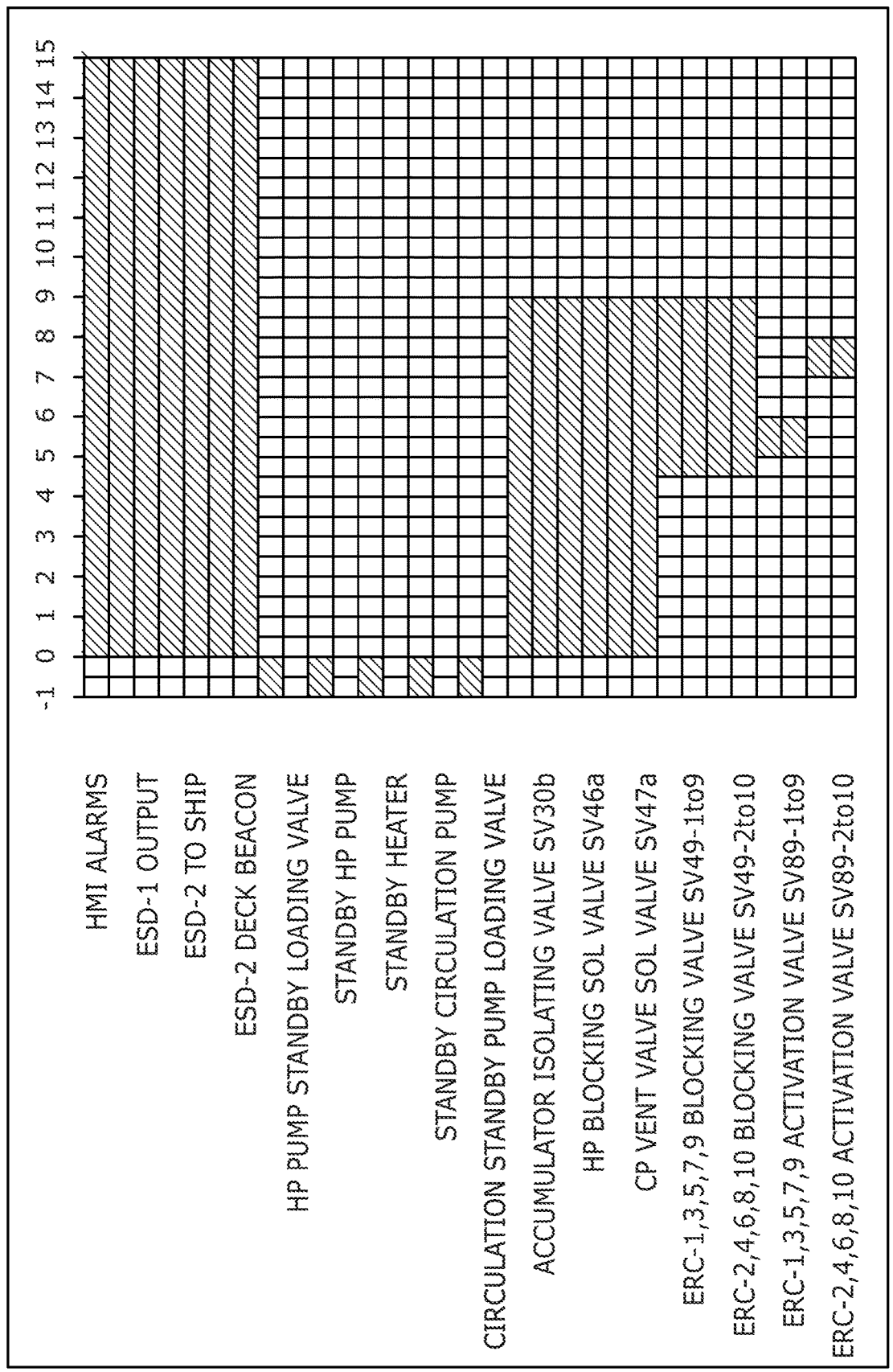

ESD-2 will be manually initiated if any ESD-2 push button is actuated. An alarm will annunciate for 5 seconds prior to release; this will allow the cargo pumps to stop. The first stage will release ERCs 1, 3, 5, 7 and 9. The corresponding solenoid valves will be held active for 1000 ms and then de-energised. There will be a further 1000 ms delay before ERCs 2, 4, 6, 8 and 10 are activated. The corresponding solenoid valves will then be held active for 1000 ms, and then de-energised. The corresponding valve timing chart is shown in FIG. 8.

All blocking solenoid valves will be held active from 500 ms before ERCs 1, 3, 5, 7 and 9 are released, until ERCs 2, 4, 6, 8 and 10 are released, and during all activation modes; this is to mitigate any chance of leakage and spurious release. All ESD-2 and ESD-1 activations will be available to view on a safety matrix screen.

Ship Distance Measurement

The distance sensors used to assess the distance between the ships have been selected because of their reliability and robustness.

The distance sensors are in a Zone 1 Hazardous area; these areas for LNG carriers are defined in IEC 60092-502. The protection philosophy chosen for the sensors is the use of an isolated barrier used for intrinsic safety applications. The barrier is rated for SIL2 applications. The barrier converts the value from the distance sensor, in this case 0-25 metres, into a 4-20 ma value.

The Siemens safety card SM336F has the following Namur NE43 fault diagnostics available: the wire break threshold alarm limit is less than 3.6 mA; and the Short circuit threshold alarm limit is greater than 21.00 mA. The relationship is shown in FIG. 3.

The barrier is transparent to the PLC and will pass through all analogue values to the PLC input. Under short circuit conditions the barrier will limit the fault current to 30 mA.

The analogue values are processed by the PLC program, if the values are above or below the alarm limits and the alarm 'Distance sensor STxx open circuit fault' or 'Distance sensor STxx short circuit fault' is displayed on the HMI.

The activation of the ERCs are based on the measurement of a ERC activation trigger distance by two out of three distance sensors to minimise nuisance releases.

Under fault conditions, the LNG transfer can continue with one out of three distance sensors in a fault condition that can either be sensor failure or discrepancy. A high priority alarm will be annunciated on the HMI alarm screen.

When only two distance sensors are available, the release of the ERCs will be based on two out of two distance sensors to effect an ESD-2 release.

Sensor Fault Scenarios

Three possible fault conditions and the resultant outcomes are set out as follows:
 one sensor in fault (<3.6 mA or >21.00 mA), two sensors giving acceptable readings (setup detailed later on). Result—alarm on the HMI;
 two sensors in fault (<3.6 mA or >21.00 mA), one sensor giving acceptable readings. Result—ESD-1 and alarm on the HMI;
 three sensors in fault (<3.6 mA or >21.00 mA). Result—ESD-1 and alarm on the HMI.

Sensor Reading Discrepancy Scenarios

Possible sensor reading discrepancy scenario are set out as follows:

one sensor reading incrementally above an alarm condition setpoint (4-10 meters), two sensors giving readings reading between 0 and 3.99 meters from the reference position (setup detailed later on). Resultant alarm on the HM;

all sensor reading between 0 and 3.99 meters from the reference position. A discrepancy of 500 mm between 2 sensors (setup detailed later on). Resultant alarm on the HMI;

all sensor reading between 0 and 3.99 meters from the reference position. A discrepancy of 500 mm between all 3 sensors. Resultant alarm on the HMI and ESD-1 activation;

two sensors reading incrementally above an alarm condition setpoint (7 meters), one sensor giving a discrepancy of >500 mm. Resultant alarm on HMI and ESD-1, followed by a timed ESD-2 release of the couplings;

two sensors reading incrementally above an alarm condition set-point (10 meters), one sensor giving a discrepancy of >500 mm. Resultant alarm on HMI and ESD-1 followed immediately by an ESD-2 release of the couplings.

Manual Activation of ESD-2

The ESD-2 Manual Activation Buttons reside within the Local Control Panels [LCP] and [RCP] Remote Control Panels. The ESD-2 Push Buttons located in the [LCP] panels are required to be intrinsically safe circuits. Intrinsically safe barriers are used for isolation; the barriers are Namur and SIL 2 rated. The Push Button at the LCP station is a single normally open contact with a Namur resistor network across it. This gives fault condition diagnostics in line with Namur specification EN 60947-5-6. The Barrier [17T (E)] has Namur functionality which is utilised for the fault monitoring.

The barrier has 2 outputs:

Output 1 will be the primary ESD-2 activation output to the PLC Safety card. This output will be true when the ESD-2 button is not active. A change of state on this output will always give ESD-2 as an output.

Output 2 will give a healthy indication output to the PLC Safety card in the case of short circuit or open circuit detection. Change of state on this output will give an ESD-1 output to the ship.

In the case of the [RCP] ESD-2 push button, we will use dual normally closed inputs, and use the safety card hardware diagnostics for short circuit detection and open circuit detection.

All inputs are required to be on Siemens Safety input modules.

Safety Solenoid Release Valves

All Solenoid position sensors are classed as process sensors and are merely monitoring the outcome of an actuation; these are not required to be on safety cards. We utilise the Namur functionality of the sensors to check for fault conditions. The sensors follow the standard fault protocol.

Safety output cards are used to actuate the ERC actuation piston solenoids. These redundant solenoids are arranged in redundant card scenarios so that any one card failure will not adversely affect the availability of the release mechanism.

The output cards also offer hardware interrogation; in the eventuality that the coil on the solenoid is open circuit, a hardware alarm is generated and shown on the HMI screen.

Alarm Annunciators

All alarms will be accompanied by a buzzer on the control room [RCP] panel. This buzzer can be muted without accepting the alarm if required.

During the proof Testing Process steps requiring operator input will be annunciated using the panel buzzer, this can be muted with the use of the mute button on the HMI.

All alarm conditions can be accepted on the screen. ESD-1 initiated by the system will always flash the white beacons on the [LCP] stations. ESD-2 initiated by the system will always flash the Red beacons and annunciate using the Sirens on the [LCP] stations. Accepting the alarm will cancel the Beacons and Sirens. Muting the Siren will leave the Beacons flashing until the alarm is accepted.

All Sirens and indications will not be on safety cards; they will be on standard output cards.

General Alarm Log Screens

All alarms will be separated into several groups:
Communication alarms.
General system alarms.
Critical alarms.
Hardware I/O alarms.

Alarms from all groups will be saved in the Alarm Log. The alarm with the highest level of importance will be displayed in the top banner display, this banner is displayed on the top line of any displayed page. An alarm log screen representation is shown below.

Alarms will be initially stored in level of priority.

Top priority alarms that initiate ESD-1, ESD-2 will always be at the top of the list.

The alarms can be accepted and when cleared will be removed from the current alarm screen but will still be available to view on the log screen.

Muting an alarm will leave the alarm current until accepted; the alarm cannot be reset until accepted.

Group alarms in the case of card faults will be masked using the diagnostic interrupts to avoid large numbers of pointless alarms.

General Communication Alarms

These alarms will be represented in the Alarm Log and the current alarm will be displayed on the top banner.

Communication Alarms and Errors can be viewed pictorially on the system Architecture Display screen.

The alarms will emphasised by the actuation of a buzzer on the front of the RCP control station.

Because of the redundant nature of the system and the selection of high availability components the loss of a single part of the communication system such as a single Profibus cable, head unit or processor will result in a low priority alarm as this does not affect the availability of the individual redundancy output or input components.

The loss of both processors or Profibus cables will elevate the alarm to Critical Priority and issue an ESD-1 output to the ship.

General Alarms

These alarms will be represented in the Alarm Log and the current alarm will be displayed on the top banner.

The alarms will be emphasised by the simultaneous actuation of a buzzer on the front of the RCP control station.

Any alarm can be double clicked resulting in a direct link to the most relevant alarm representation page as shown in the representation below.

During transfer operations these alarms will be classed as non-critical and usually will be the result of a failed item in a redundant pair. Because the function is still available these alarms will be assigned a low priority. The operator has the option to continue with the transfer, or stop the transfer and repair the fault.

During the Proof testing process when an alarm is classed as being non critical, such as a redundantly configured oil temperature sensor or redundant pump arrangements and associated valves, the operator will have the option to take the sensor out of service This option is only available at the supervisor level of password protection, and will become part of a permit process issued from the ship.

Safety critical items cannot be removed from service during proof test. Such items are Accumulators, Distance Sensors and ERC activation solenoid valves that are required always to be available for service.

Safety Critical Alarms

These alarms will be represented in the Alarm Log, and the current alarm will be displayed on the top banner.

The alarms will be emphasised by the simultaneous actuation of a buzzer on the front of the RCP control station.

These alarms will always have the highest level of priority, and will generally be accompanied by ESD-1 activation.

The system is designed so that with an active ESD-1 condition, the system will still be capable of actuating an ESD-2 condition.

The operator is not permitted input during a critical alarm situation. The result of Safety critical alarms is a function of the software and cannot be influenced by the operator.

If both redundant sensors fail on the same ERC, where normally individual sensor failure would be low priority, this is elevated to a Safety critical alarm. This is because the availability of the ERC cannot be assessed by the software, and an ESD-1 condition will be activated.

The firing pin sensors are the exception to this, as the firing pins can be visually assessed to ensure they are in position.

Hardware I/O Alarms

These alarms will be represented in the Alarm Log and the current alarm will be displayed on the top banner.

The alarms will emphasised by the simultaneous actuation of a buzzer on the front of the RCP control station.

Individual hardware channel faults will be assigned a low priority, if they are part of a redundant pair of inputs or outputs. Typical faults may be an open circuit on a sensor with Namur functionality, or the detection of an open circuit on a solenoid valve safety output. In the case of an Input or Output card hardware failure this will assessed depending on control mode. Hardware card failure will be assessed as one priority higher than an individual hardware alarm protocol during transfer as redundancy is available. This alarm level does not give out an ESD-1 but will always be the highest ranking alarm on the log list. During Proof Test this will be a high priority alarm and will inhibit the Proof Test sequence until rectified.

Individual Hardware faults will always be classed as low priority during transfer if redundancy is available.

Input Card hardware failure alarms will always mask the relevant input alarms generated by a hardware failure.

Maintenance Screens

This maintenance screen will be made available to the operator, only when the system is in Proof Test mode and manual control has been selected.

The maintenance screen has only one function, to be able to perform maintenance on the Circulation and Pressure pumps. The function will be semi-automatic. The operator will be able to start and stop the pumps via the HMI maintenance screen manually. Manual mode valve actuation will be available only when there is no pressure in the system.

Supervisor Password Screen

During the proof test process the Supervisor Password screen can inhibit non critical sensors and final elements, this function is reset at the beginning of each Proof Test Process.

Safety Matrix

After an ESD-1 or ESD-2 activation, the safety matrix screen will be available to diagnose the reason behind the release. An alarm will also have been generated.

Figure 5:
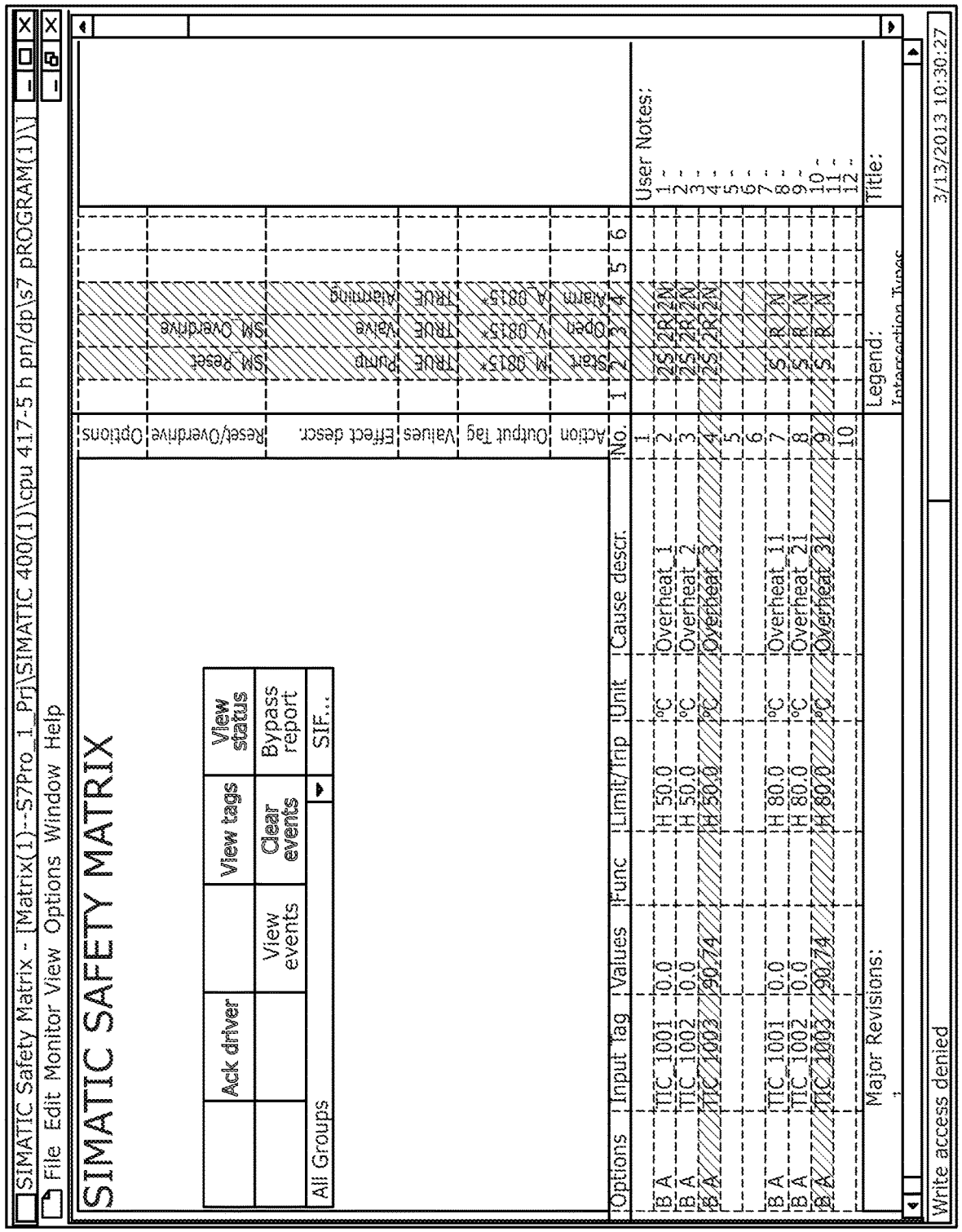
FIG. 5 shows a safety matrix.

The Safety Matrix, an example of which is shown in FIG. 5, is available at any time to give the operator easy access to the various failure and ESD situations that the system is checking.

System Start and Initialisation

The operator is required to follow the check routine available in the IOM before applying power to the system as follows:

1. Ensure Control Panel-1 (CP-1), Control Panel-2 (CP-2) and Control Panel-3 (CP-3) enclosures are sealed and secured.
2. Ensure all sealing caps are secure on the individual ERC connection cables.
3. Ensure that all covers are secured on the HPU motor and heater terminals.
4. Visually check all HPU hydraulic hoses and connections.

Power System Start-up Routine

All 220 vac or 440 vac power is distributed from CP-1. This ensures that when CP-1 is isolated all ERS enclosures have no power available to them.

The operator will ensure the following isolators are in the Off position:
    Local 440 vac Supply 1,
    440 vac Supply 2,
    220 vac UPS-1 and 220 vac UPS-2 (not currently shown on the drawings).

In the Switch-gear room the operator will engage the HPU Molded Case Circuit Breaker (MCCB) and the Control supply Miniature Circuit Breakers (MCB) in the following order:

1. {Switch the HPU 440 vac Supply 1 MCCB to the on position}.
2. {Switch 220 vac UPS-1 supply MCB to the on position}.
3. {Switch 220 vac UPS-2 supply MCB to the on position}.

The operator will then switch on the Local isolators in the following order:

1. {Switch on the Local HPU 440 vac Isolator 1}
2. {Switch on the Local 220 vac UPS-1 Isolator}
3. {Switch on the Local 220 vac UPS-2 Isolator}

Control System Start-up Routine

Once UPS supply 1 and 2 have been switched on, the CPU 1 [41A2] located in enclosure RCP will perform a start routine. If successful, the CPU-1 will enter single mode as the master processor.

CPU-2 [41A4] located in enclosure RCP will now perform a start routine. If successful, CPU-2 will request a synchronising link with CPU-1. The master CPU-1 will compare the programs of both processors and update the Slave CPU-2 with the master program, if any changes are detected.

The CPU-1 will then connect to and perform communication diagnostic checks on the following Profibus headunits:
    RCP Profibus head unit [44U2(E)]
    CP-1 Profibus head unit [14U2(E)] and [14U4(E)]
    CP-2 Profibus head unit [23U1(E)] and [23U3(E)]
    CP-3 Profibus head unit [33U1(E)]

CPU-1 will also connect to the HMI [3U7(E)] using the redundant Profinet ring PN:1.

The CPU-2 will then connect to and perform communication diagnostic checks on the following Profibus head units:

RCP Profibus head unit [44U3(E)]
CP-1 Profibus head unit [14U3(E)] and [14U5(E)]
CP-2 Profibus head unit [23U2(E)] and [23U4(E)]
CP-3 Profibus head unit [33U2(E)]

CPU-2 will also connect to the HMI [44U6(E)] using the redundant Profinet ring PN:2.

When the system has both CPUs on line and synchronised, all analogue and digital input information is read simultaneously. Both CPUs then receive and process diagnostic information from the input and output hardware cards.

Only the Master Processor will write to the output cards. If at any time the Master Processor fails, the Slave Processor will be promoted to Master status and seamlessly continue the processing and writing to the output cards, without process interruption. An alarm will be generated on the HMI alarm log list.

In the event of a CPU, Profibus or Profinet communication error being initiated during the start routine, the CPU and related Profibus head unit without error will become the Master.

The system in error will become the slave unit. An alarm will be generated on the HMI alarm log list.

The Fault will also be available for view on the system architecture diagnostic page.

Main Power and Control Voltage Supply Philosophy

The 440 vac power supply from the Switch room is a not a Redundant supply. The Actuation Pressure is provided with redundant accumulators so that the Hydraulic pumps do not require redundancy. Control supplies are required for ERC activation.

All control supplies are redundant on the system. When the system is active the system monitors all the power supplies: both AC and DC. The 440 vac and 220 vac monitor relays verify the presence of a voltage supply from the Switch Room.

CP-1 440 vac Supply 1 line Monitor [13U1(E)] offers diagnostic functionality using coded binary inputs, the alarm states are shown in the Cause and Effect. The binary inputs are as follows:

Binary input 1—Rack [CP-1.1(E)], Card [19A1(E)] Input [X1-16(E)]
Binary input 2—Rack [CP-1.1(E)], Card [111A(E)] Input [X1-16(E)]

The 230 vac line monitors use a single binary input to indicate a fault state as follows:

CP-2 230 vac UPS-1 Line monitor [22U1(E)]
Binary input—Rack [CP-2(E)], Card [217A1(E]
CP-2 230 vac UPS-2 Line monitor [22U2(E)].
Binary input—Rack [CP-2(E)], Card [218A1(E)]

Healthy state is indicated by a True input. Loss of power or fault indication is indicated by the state changing to False.

All 24 vdc PSUs have unmonitored upstream protection (230 vac) provided by two pole MCBs. All downstream protection (24 vdc) is provided by single pole MCBs or fuse protection. 24 vdc Redundancy is provided by a diode module attached to each power supply. The redundancy module offers seamless changeover of power supplies. Failure indication is provided with a binary feedback contact to a PLC input. Healthy state is indicated with a True input. Module failure or Power failure results in a False output.

Below is a List of redundant Pair Power supplies and diode modules and input locations:

RCP 24 vdc Power Supply and Redundancy module 1 [43V1(E)] [43V3(E)]
Binary input—Rack [RCP(E)], Card [417A(E)] Input [0(E)]
RCP 24 vdc Power Supply and Redundancy module 2 [43V2(E)] [43V4(E)]
Binary input—Rack [RCP(E)], Card [417A(E)] Input [1(E)]
CP-1 and CP-2 24 vdc Power Supply and Redundancy module 1 [21V1(E)] [21V2(E)]
Binary input—Rack [CP-2.1(E)], Card [217A(E)]
CP-2 24 vdc Power Supply and Redundancy module 2 [22V3(E)] [22V4(E)]
Binary input—Rack [CP-2.1(E)], Card [218A(E)]

The Intrinsically safe power supply modules for the Interface modules [33U1(E)] and [33U2(E)] have inbuilt redundancy and failure information. The failure information is passed via the back plane bus to the software:

CP-3 24 vdc Power Supply and Redundancy module 1 [33V1(E)]
CP-3 24 vdc Power Supply and Redundancy module 2 [33V2(E)]

Any one power supply alarm will result in an alarm display on the HMI.

Two failed supplies on the same rack will result in an ESD-1 output to the ship.

When all Pre-start routines have completed a system pressure check routine is initiated. Sensors [34b, 34a and 34d] are checked, if the pressure is greater than 5 bar the following screen is displayed, the screen stating "Please Manually De-pressurise the Accumulators 37a and 37ba and press Re-test".

Pre-start Sequence Checks

When the start routine and has completed a popup will appear on the HMI screen, the popup stating "Switch Emergency Release Coupler Switch (415S2) to the Proof Test Position and press Accept". To accept, the operator presses the Accept button on the HMI.

The key switch [415S2(E)] has a normally open and normally closed contacts giving us Non-Equivalent monitoring on the safety input (Safety Philosophy in a separate Chapter), in the Proof Test position Rack [RCP(E)] Card [15A(E)] Input [1(E)] is True and Input [13(E)] is False.

The Switch enables 4 functions in the Proof Test position.
1. Enables program variable information to pass in one direction only between the Non Safety program and the Safety Program. Placing the switch in the ready/Transfer position at any time will disable this function.
2. Sets all equipment available for service irrespective of the previous transfer state (out of serve or otherwise)
3. ESD-1 signal output RCP [130K1(E)] and ESD-2 signal output RCP [130K2(E)] will be de-energised giving a permanent ESD-1 and ESD-2 signal to the ship during the Proof Test process. This will dictate that the system has to have completed a Proof test, and be in transfer mode, before any product can be transferred. Override of this function is not possible. Any override of the ESD-1 feedback will be part of the ships permit to work system and will form no part of the KLAW ERS system.
4. Enable the Proof test sequence.

Once the Key switch [415S2(E)] is in Proof test mode, the system will remain in a dormant state until the proof test sequence is initiated. The proof test is initiated by starting the oil heating and verification cycle.

When, a successful Proof Test procedure completed, the Operative is Prompted to switch [415S2(E)] into the Transfer position, this inhibits any Variable transfer between the Process and Safety software This also enables the Safety instrumented Functions, Automatic (distance Measurement) and Manual (ESD-2 Push buttons).

Initial Validation

All ERCs to be used for the transfer of LNG must be manually selected before starting the validation check.

{Operator Presses ERC-1 Button on the HMI prompt}—This will then display a Popup on the HMI screen where the operator can select if the transfer hose is a Vapour or a Liquid hose.

{Operator Presses Accept Button on the HMI prompt}.

Before commencing Hydraulic checks, the system checks only the active heads which are connected to the ERS.

Because the thermocouples and proximity sensors all have the same pin location on all connectors, the system can check the selected ERC sensors for fault conditions. The following alarm conditions are also checked and any resulting alarms are indicated on the HMI.

[ERC-1] is selected; has no electrical connector.

[ERC??] is not selected; please disconnect electrical connector.

Firing Pin Monitoring

The ERC-1 Firing pin position is monitored using proximity sensors [22S1] and sensor [22S2]. The sensors are connected to a Namur input card 22A1 in CP-3. The system performs diagnostic checks on the sensors giving the following possible alarm states on the HMI.

ERC-1 [21S1 (E)] Firing pin sensor short circuit or open circuit Fault.

ERC-1 [22S1 (E)] Firing pin sensor short circuit or open circuit Fault.

ERC-1 [21S1 (E)] [22S2 (E)] detecting Locking pin present during Proof Test.

ERC-1 [22S1 (E)] [22S2 (E)] Firing pin sensing conflict during Proof Test.

When the system has validated the ERC and connector configuration and confirmed that no Firing pin is present on the ERC to be Proof Tested, an HMI window display a message asking the operator to accept the configuration and start the proof test or to reject the configuration and reconfigure the ERCs.

{Operator Presses Reject Button on the HMI prompt}—Rejecting the configuration will re-start the sequence at the ERC selection screen.

{Operator Presses Accept Button on the HMI prompt}—Separation sensor zero position verification step initiated and the next prompt will be displayed, as shown in the next section.

Oil Heating and Verification Routine

All Duty Standby pumps and heaters will alternate between Duty and Standby on a balanced hours run basis. The program will keep the run hours equal between the Duty and Standby item.

{Operator Presses the Accept button on the HMI to initiate control loop}.

The system then executes the oil protection and verification control loop. This control loop will be continually executed whilst the Heaters are active.

Test Process:—

1. If [LS77] low level is not active, the system will enable the heater outputs.
2. If thermal cut-outs [S18a and 18b] are healthy enable heater start
3. The software uses a Thermocouple [TT4a] and [TT4b] to assess the temperature of the oil. If the temperature of the oil is below 30° C., both heater contactors [130K3(E)] and [131K3(E)] are activated.
4. During the oil heating phase, if no temperature rise is detected after 30 minutes, an alarm will be generated 'Oil temperature not increasing—please check heater circuit'.
5. When the oil temperature reaches 35° C., the standby heater output is de-activated. The duty heater will raise the oil temperature to 40° C.
6. During the oil heating sequence [SV21a] and [SV21b] will be energised to circulate the oil. [SV47a] and [SV47b] will be energised to ensure no oil pressure is available at the ERC. The Pumps [M6] and [M7] will be cycled between duty and standby every 30 minutes to assist in circulating the oil during the heating phase.
7. During Proof testing, the Oil Heaters will maintain oil tank temperature without the need to use the Oil Circulating Pumps.
8. When the temperature set-point is reached an HMI screen pop up will display as shown below and buzzer output [31H1] on panel RCP will be activated.

{Operator Presses the accept button on the HMI prompt to initiate warm proof test procedure}—the buzzer is cancelled and the prompt in the 'Separation sensor fully retracted verification' section will appear on the HMI screen.

Proof Testing

From this point on in the proof test process, a counter will be displayed in the corner of the HMI screen. This counter will count down from 48 hours and will be clearly visible to the operator. If the proof test is not completed, and the system is put into transfer mode before the counter reaches 0 hours, the proof test process will be aborted and re-started from an earlier step.

Alarms will sound every 2 hours when the counter is below 12 hours from abort. The alarms will be cancelled once the system is active.

A Proof Test Abort button will be available to the operator to abort and restart the proof test process at any time.

In the event of failure of the sequence, there will be a hold and abort. Example, filter blocked during proof test. The system stops the sequence, and the operator changes the filter. The sequence cannot complete without a filter check, so abort step and restart filter check sequence.

Warm Proof Test

We are going to select ERC-1, for the purposes of this test narrative.

The IOM will indicate that all unused ERC couplings should have be electrically and hydraulically disconnected before starting the Proof Test procedure.

Within the narrative there will be two Proof Test descriptions used:

Proof Test—this indicates a full functionality test is performed, such as actuate solenoid, and feedback is registered on a sensor;

Partial Proof Test—this indicates a partial functionality check, such as ERC actuator piston stroked, and feedback is registered on sensor. This is because the Firing pin is absent we are not doing a full functionality test. The coupling has not activated so this cannot be assessed as a full Proof Test.

During the proof test process any failed sequence step will result in alarm indication and an operator choice. These pop ups will not be mentioned in the narrative to simplify the sequence descriptions.

For any failure that would normally result in an ESD-1 alarm, the operator will not be given the option to continue the proof test; only the retest option will be available.

Within the Proof Test Process, if a non-critical sensor fails a validation, and a redundant sensor is available, it is permitted to remove the sensor from service for the duration of the remaining Proof Test process and subsequent Transfer process. This function is only available via the Supervisor password access level.

Critical plant items will not have the option of being removed from service.

When Proof Test is selected for subsequent transfers, all sensors will be re-enabled, and to remove a sensor from service will require implementation of the documented procedure.

Within the IOM procedure the operator will have been asked to remove the Firing pin on active ERCs prior to commencing the Proof Test.

Separation Sensor Fully Retracted Verification

During the warm proof process the system will verify that the three distance sensors are connected. There is no requirement to ensure that the sensors are connected in any particular configuration. Up to 5 meters of wire can be cut from the distance sensor. This is allowed because the distance sensor maximum extension is 25 m. The theoretical maximum extension for ESD-2 is 15 m. Removing 5 m will leave 5 m in reserve.

The pass criteria of the Distance sensors at this point are three out of three distance sensors; no failures will be tolerated. Any failure will have to be rectified and a retest initiated.

{Operator Presses Start Test on the HMI prompts}—The following test sequence is executed:

To verify all plugs are connected, a minimum of 4 ma is expected on each sensor input, a figure less than 3.6 mA will generate an alarm on the HMI and stop the test sequence.

Fully retracted, the absolute measured length is required to be in the range of 0.0 m to 5.0 m. Any absolute measurement outside these values will generate an alarm on the HMI indicating the problem and will stop the test sequence. The only option available on these sensors is replacement and re-test.

When all the criteria are satisfied, the program will take the zero position value and store it in the safety program within a variable block. This will then be used for future incremental checks during the Distance sensor Validation checks.

A HMI prompt will be displayed on completion of a successful test, the HMI prompt asking the operator whether to initiate an oil circulation and pressure proof test.

Oil Circulation System Proof Test

For the purposes of simplifying the sequences, once feedback has been checked on a valve, we will not refer to the feedback sensor during subsequent sequences. The program will always check for valve actuation after every movement request, and generate an alarm on failure of movement.

The test will follow a pre-set sequence that can be broken down into the following steps:
1. Solenoid Position feedback checks (common system checks)
2. Motor function and pressure sensor and flow sensor verification (common system checks)
3. ERC Sensor and Actuator Verification (Individual ERC Checks)

Solenoid Position Feedback Tests I

Before pressurising the system, the program performs a sequence of actuation tests to ensure correct solenoid function.

In this case the narrative will refer only to the ERC-1 blocking valves and activation valves. If additional ERC valves are validated, their respective blocking and activation valves will be tested in subsequent sequence steps. To ensure there is no back leakage, all blocking valves are required to be energised on an activation. All blocking valves attached to the manifold are required to pass the proof test process.

Note:—

[SV48-1] and [SV49-1] are energised to close. All other valves are energised to open.

Test Process:—
Energise valve [SV21a] and check sensor [S90-33] for change of state from False to True. Valve remains energised;
Energise valve [SV21b] and check sensor [S90-34] for change of state from False to True. Valve de-energised;
Energise the ERC-1 normally open blocking valves [SV48-1] and [SV49-1]. Check feedback change of state from True to False on sensors [S90-11] and sensor [S90-12]. De-energise valves;
Energise the ERC-1 High pressure normally closed blocking valves [SV88-1a] and [SV89-1b]. Check feedback change of state from False to True on sensors [S90-1] and sensor [S90-2]. Valves de-energise after test.

Motor Function and Pressure Sensor, Flow Sensor and Filter Verification

Process:

Energise the ERC-1 normally open blocking valves [SV48-1] and [SV49-1]

The program will de-energise [SV47-a] and [SV47-b] irrespective of their previous state before performing the next step.

Energise contactor [130K2(E)]. Monitor contactor feedback input change of state from True to False.

If Duty pump is not available start Standby, if both pumps are not available abort test Execute pump run for 5 minutes (to be confirmed during commissioning). Monitor the return to tank clogging filter [F85a] and circulating pump [M6] Hydraulic filter [F9a].

Feedback is provided by [S85b] and [S28a]. The healthy state is True. False indicates a blocked filter.

If [S85b] and [S28a] are true for 30 seconds. Terminate test early.

De-energise Valves [SV21a].

Pump [M6] is now pressurising the system. The system pressure is set to 40 bars.

Recirculation Pump Tests

The following tests are carried out every 5 seconds during the pressurisation period:

The pressure is evaluated using sensors [PT32a], [PT32b] and [PT32C]. Allowable deviation between the sensors is 5 Bar deviation greater than this will result in a HMI alarm and re-test prompt.

If the pump has not achieved pressure 40 bar on sensors PT32a. PT32b and PT32c after 60 seconds this will result in a HMI alarm and re-test prompt The system checks for major leakage this is designated by the following parameters [FT72]>4.5 LPM and PT32c less than 10 bar this will result in a HMI alarm and re-test prompt.

The system checks for minor leakage [FT72]>2 LPM and PT32c less than 35 bar this will result in a HMI alarm, this condition will not stop the proof test although the system will fail to reach 40 bar after 60 seconds.

Valve SV47a and 47b Tests

Valves [SV47-a] [SV47-b] have no electrical feedback so the pressure sensor [PT32c and PT32d] are used to detect valve opening and closing.

When the system has reached 40 bar the pump is commanded to stop.

The system waits 10 seconds and checks that check [PT32c and PT32d] are above 20 bar; this check ensures the system has no leaks and that there is more than 20 bar available for the following test Valve [SV47-a] is energised, pressure drop to less than 1 Baron [PT32c and PT32d] is an acceptable indication of valve open, Valve [SV47-a] is de-energised if no pressure drop is measured a pop up will appear on the HMI indicating the valve has not opened, the system will abort Pump [M7] is started (standby pump):

Perform Circulating pump [M7] Hydraulic filter [F9b] blockage check for 5 minutes (TBC). Feedback is provided by [S28b]. The healthy state is True; False indicates a blocked filter. When [S28b] is true for 30 seconds, terminate test early.

De-energise Valves [SV21b], [SV47-a] and [SV47-b].

Perform the tests specified in the "recirculation pump tests section on pump [M7].

When the system has reached 40 bar the pump is commanded to stop.

Valve [SV47-b] is energised, pressure drop to less than 1 Bar is an acceptable indication of valve open, [SV47-b] de-energised. if no pressure drop is measured a pop up will appear on the HMI indicating the valve has not opened, the system will abort Open valves [48.1-48.10] and [49.1-49.10] check feedback ERC Sensor, Actuator and Filter Verification All active heads will be checked sequentially for 60 seconds Test Process for ERC-1:—

Close valves [48.2-48.10] and [49.2-49.10] check feedback ensure [SV48.1 and 49.1] remain open Duty pump commanded to start The circulating system will now pressurised. The ERC-1 Hydraulic cylinder will be fully extended, and circulation will commence. This is verified when sensor [23S3 (E)] is True.

If [23S3 (E)] remains False, an HMI Alarm will be triggered.

Head temperature sensors [TT01] and [TT02] deviations are monitored during the test. Acceptable temperature deviation is 5° C.

An ERC flow test is performed using flow sensor [F172] to verify that the manual filter and ERC circulating return filter [F55-1] are not blocked, and in a healthy state:

Manual filter [60-1]—no feedback

ERC circulating return filter—feedback provided by [S53a] (normal operation False)

The normal flow for one valve is 300 cc per minute. The alarm set-point is set at 200 cc per minute (to be confirmed during commissioning).

The flow test will be performed for 1 minute (TBC) on each ERC. If after this time, the feedback on the ERC circulating filter is True, or the flow is below the 200 cc per minute, an alarm will be generated and the operator will be given the option to re-test.

The test is carried out on all active ERC's by shutting all valves SV48 and 49 apart from the valves on the ERC to be tested.

Activation Pressure Circuit Proof Test

The test will follow a preset sequence that can be broken down into the following steps. For the purposes of simplifying the sequences, once feedback has been checked on a valve, we will not refer to the feedback sensor during subsequent sequences. The program will always check for valve actuation after every movement request, and generate an alarm on failure of movement:

Solenoid Position Feedback Tests II

Before pressurising the system, the PLC performs a sequence of actuation tests to ensure correct solenoid function before starting the High Pressure pumps.

In this case the narrative will refer only to the ERC-1 blocking and activation valves, if additional ERC valves are validated their respective blocking valves will be tested in the same sequence step as they would be actuated so in two banks 1, 3, 5, 7, 9 and 2, 4, 6, 8, 10.

Test Process:—

Energise ERC-1 normally closed blocking valves [SV88-1] and [SV89-1], check the feedback change of state from False to True on sensors [S90-1] and sensor [S90-1];

Energise Valve [SV20a] and check sensor [S90-31] change of state from False to True, the valve remains energised;

Energise Valve [SV20b] and check sensor [S90-32] change of state from False to True. De-energise the valve;

Energise ERC-1 open blocking valves [SV48-1] and [SV49-1] check the feedback change of state from True to True false on sensors [S90-11] and sensor [S90-12]. De-energise after test.

Burst Accumulator Bladder Check

Energise Valves [SV46a], [SV46b] [SV88-1] and [SV89-1], and de-energise [SV48-1] and [SV49-1] to remove residual pressure from the hydraulic system. These valves have no feedback and will be checked using a separate Process later in the sequence.

If the pressure on sensor [PT34a] is greater than or equal to [PT43a] an alarm 'Please Manually Bleed Accumulator'.

If the pressure on sensor [PT34b] is greater than or equal to [PT43b] an alarm 'Please Manually Bleed Accumulator'.

Open Valves [SV30a] and [SV30b].

Measure Nitrogen pressure sensors [PT43a] and [PT43a].

A value below 100 Bar will trigger an alarm.

De-energise Valves [SV30a], [SV30b], [SV46a], and [SV46b].

For all ERC's close activation valves [SV88 and SV89]

Motor Function, Solenoid Position and Sensor Evaluation

The duty pump will be selected for the valve leakage evaluation sequence. In this case it is pump [5b]. The pumps [5a] and [5b] are interlocked in the software, so it is not possible to run both pumps at the same time.

Energise valve [SV20b].

Energise Contactor [31K1(E)]. Monitor contactor feedback input change of state from True to False.

Pump [M5b] circulates oil through Hydraulic High pressure filters [F8b] and return hydraulic hose filter [F85a] for a period of 5 minutes (TBC). Filter blockage feedback is provided by [S86a] and [S27b]. The healthy state is True; False indicates a blocked filter.

If [S86a] and [S27b] are true for 60 seconds, terminate the test early.

Stop motor [M5b]. De-energise valve [SV20b].

Energise solenoid valve [SV20a]. Energise [M5a] contactor [30K1(E)], and monitor contactor feedback input change of state from True to False.

Pump [M5a] circulates oil through Hydraulic High pressure filter [F8a] for a period of 5 minutes. Filter blockage feedback is provided by [S27b]. The healthy state is True; False indicates a blocked filter. If [S27a] is true for 60 seconds, terminate the test early.

De-energise valve [SV20a].

Energise Valves [SV30a], [SV30b], [SV46a] and [SV46b]

Pressure Sensor Evaluation

There are non-return valves on the pump pressure hydraulic hoses to inhibit any pressure loss through the non-running pump. Because of this, it is not possible to test all the pressure sensors in one sequence.

The duty and standby test sequences are interchangeable. Pump [M5a] is now pressurising the system.

During all the following pressurisation sequences for 150,170 and 230 bar set-points the following tests are performed:—

If the pump has not achieved pressure setpoint pressure on sensors PT34a. PT34b and PT34c after 60 seconds this will result in a HMI alarm and re-test prompt The system checks for major leakage this is designated by the following parameters [FT73]>4.5 LPM and PT34c less than 10 bar this will result in a HMI alarm and re-test prompt The system checks for minor leakage [FT73]>2 LPM and PT34c less than 50 bar this will result in a HMI alarm, this condition will not stop the proof test although the system will fail to reach 150 bar after 60 seconds.

The system pressure is set to 150 bar. When this is pressure is achieved, stop pump [M5a]. The pressure is evaluated using sensors [PT34a], [PT34b], [PT43a], [PT43b], [PT34c], [PT34d] and [PT83]. Allowable deviation between the sensors is 5 Bar during the test sequence duration of 5 seconds (to be confirmed during testing).

Close Valves [SV46a] and [SV46b].

Energise valve ERC-1 Solenoid valves [SV88-1], and [SV89-1] to bleed system pressure. When the pressure is less than 5 bar [PT83], de-energise ERC-1 Solenoid valves [SV88-1] and [SV89-1].

Energise solenoid valve [SV20b]. Start Pump [M5b] and then de-energise solenoid valve [SV20b]. When 170 bar pressure is achieved, stop pump [M5b]. Pressure is evaluated using sensors [PT34a], [PT43b], [PT43a], [PT34b], [PT34c] and [PT34e]. Allowable deviation between the sensors is 5 Bar during the test sequence duration of 5 seconds (to be confirmed during testing).

Valve Position and Leakage Evaluation

During this sequence a test failure will result in the full sequence being re-tested.

Energise solenoid valve [SV20a]. Start motor [M5a] and then de-energise solenoid valve [SV20a]. When pressure sensors [PT34a] and [PT34b] measure 230 bar (TBC), valves [SV30a] and [SV30b] de-energise, storing the pressurised charge. Stop Pump [M5b].

Energise valve ERC-1 and solenoid valves [SV88-1], [SV89-1], [SV46a] and [SV46b]. to bleed system pressure.

Check pressure sensors [PT34a and PT34b] for pressure above 180 bar, if pressure is below 180 bar re-pressurise system, if pressure is below 180 bar and pressurisation has been attempted more than 3 times alarm on the HMI and abort the test Monitor Pressure sensors [PT43a] and [PT34a] for 5 minutes. A reduction in pressure of 50 Bar (TBC) will indicate a leak from the solenoid [SV30A] and trigger an alarm.

Monitor Pressure [PT43b] and [PT34b], for 5 minutes. A reduction of pressure of 50 Bar (TBC) will indicate a leak from the solenoid [SV30b] and trigger an alarm, solenoid valve [SV30a] and [SV30b] tests are performed concurrently.

De-energise Solenoid Valves [SV46a] and [SV46b].

Energise Solenoid Valve [SV30a].

Monitor pressure sensor [PT83]. If after 5 minutes (TBC) the pressure has increased significantly on [PT83], an alarm will be triggered: 'Valve [SV46a] or [SV46b] leaking' retest if less than 3 attempts, if not abort.

Energise Solenoid Valve [SV46a].

Pressure sensor [PT83] monitors an increase in pressure. De-energise [SV46a]. No change in pressure will trigger an alarm 'Valve [SV46a] failed actuation test'. De-energise [SV30a] We have checked the function of [SV30a] earlier in the sequence.

Energise valve ERC-1 and solenoid valves [SV88-1], [SV89-1] to bleed the system. Then de-energise.

Energise [SV30b].

Energise Solenoid Valve [SV46b].

Pressure sensor [PT83] monitors an increase in pressure. No change in pressure will trigger an alarm 'Valve [SV46b] failed actuation test'. De-energise [SV46b] and [SV30b]. Perform accumulator pressurisation sequence to 230 bar Blocking Valve Hidden Leakage Test Energise all [SV88 and SV89] valves.

Energise all [SV48 and SV49] valves

Energise [SV46a,SV30a] valves

Check for pressure above 180 bar on sensors [PT83, PT34c], if less than 180 bar re-pressurise system.

Check for pressure leakage above 50 bar in 60 seconds, if above 50 bar leakage abort test and alarm on the HMI.

The following test is carried out on each individual ERC for the purposes of this narrative we will describe only the test on ERC-1 If at any time the accumulator pressure drops below 180 bar the test will be suspended and the accumulator will be re-pressurised before recommencing the test sequence Energise [SV48-1] check for pressure leakage above 50 bar in 60 seconds, if above 50 bar leakage abort test and alarm on the HMI [SV49-1] leaking please replace valve and restart proof test De-energise [SV48-1] and energise [SV49-1] check for pressure leakage above 50 bar in 60 seconds, if above 50 bar leakage abort test and alarm on the HMI [SV48-1] leaking please replace valve and restart proof test Repeat test for all ERC's and then de-energise all active valves and perform a re-pressurise sequence to 230 bar Pump Flow Test Energise ERC-1 solenoid valves [SV88-1] and [SV89-1]. This test evaluates the pump flow available to the system.

Energise valve [SV20a].

Start pumps [M5a].

De-energise valve [SV20a].

Energise solenoid valves [SV46-a] and [SV46-b].

The ERC-1 solenoid valves [SV48-1] and [SV49-1] are already de-energised from a previous step.

Monitor Flow from the Pump for a period of 5 minutes (TBC) using flow sensor [FI73]. A flow of 4000 cc per minute (TBC) is acceptable at 40° C.; a flow below 2000 cc per minute will generate an alarm on the HMI.

Stop Pump [M5a]

Energise valve [SV20b].

Start pumps [M5b].

De-energise valve [SV20b].

Monitor Flow from the Pump for a period of 5 minutes using flow sensor [FI73]. A flow of 4000 cc per minute (TBC) is acceptable at 40° C.; a flow below 2000 cc per minute will trigger an alarm.

Stop Pump [M5b].

Check pressure has reduced below 20 Bar on [PT83]. When this is True, de-energise ERC-1 solenoid valves [SV88-1] and [SV89-1] and solenoid valves [SV46-a] and [SV46-b].

When the activation pressure circuit proof test is complete, a message will appear on the HMI screen, the message confirming completion of the present circuit proof test and asking the operator whether he wishes to initiate the ERC Hydraulic Cylinder Actuation Verification.

{Operator presses accept button to initiate ERC Hydraulic Cylinder Actuation Verification}

ERC Hydraulic Cylinder Actuation Verification

This is a partial Proof Test as only the hydraulic cylinder is activated. The coupling is not activated and therefore the ERC cannot be classed as having had a full Proof Test.

In this case we are only testing ERC-1. If more ERCs are to be tested, these will be tested individually. During circulation, the subroutine for piston position evaluation and filter blockage checking is active.

Solenoid valve out of position is a permanent check loop and is always running in the program.

Start Oil Circulating Pumps

Notes:—

As the system can be deployed in many environmental conditions, a warming cycle will be performed on the active ERCs.

The initial temperature of the coupling may be below 0° C. because of very low external ambient conditions. During the warming of the coupling, low temperature alarms are inhibited until the ERC has reached 8° C. Once the coupling has reached this temperature, the ERC is subject to the standard alarm conditions.

In the eventuality that one or more ERCs does not reach working temperature, the program will allow an additional time (to be decided during commissioning) for the coupling to reach temperature and log the temperature rise during this period. If no temperature rise is logged, an alarm will be generated 'ERCxx low temperature'. If the temperature rise is slow, the alarm 'please check ERC xx manual filter' will be issued.

During normal oil circulation, to avoid unnecessary alarms, all filter and temperature alarms will have a 30 second delay before activation. The oil high temperature cut-out is the exception. This alarm will always result in the heater control circuit being immediately de-energised.

Sensors are subject to a 1 out of two voting arrangement.

The Duty Pump will always be selected if available.

Process:

During Proof testing the Oil Immersion Heaters are maintaining oil tank temperature.

Check ERC-1 solenoid valves [SV48-1] and [SV49-1] are de-energised; if they are energised, de-energise. This allows the return path to the tank.

Check solenoid valves [SV47-a] and [SV47-b] are de-energised; if they are energised, de-energise.

Energise solenoid valve [SV21a].

Start the duty circulation motor in this example [M6]. De-energise valve [SV21a].

Check flow feedback on sensor [FI72].

Flow oil through the ERC-1 (or all active ERCs). Evaluate the temperature of the release mechanism using sensors [TT01] and [TT02].

When each active coupling reaches a minimum temperature of 5° C., the following checks are performed by the system:

Check Temperature deviation between active ERCs. For any deviation above 5° C., generate an alarm.

Check Temperature deviation between sensors [TT01] and [TT02]. For any deviation above 5° C., generate an alarm.

Once an ERC has cycled through the 8° C. set-point during the warming cycle, low temperature alarms will be activated and will trigger an alarm if the ERC drops below 8° C.

Firing Pin Monitoring

A HMI prompt asks the operator to check whether the firing pins are removed. {Operator Presses Accept Button on the HMI prompt}

Pre-test:—

The system checks that the firing pins are removed from the active heads. During the proof test process, the removal of the pins will not generate an alarm.

The Hardware checks for short circuit and open circuit as described in the 'solenoid position feedback tests II' section are always active. These faults will always generate an alarm on the HMI.

The sequence will not complete until all firing pins are removed and verified.

Test ESD-2 Push Button Prompt

When all active ERCs are above 5° C., a message confirming that all ERCs are at working temperature will be displayed on the HMI screen:

{Operator Presses Accept Button on the HMI prompts}

System pressurisation and activation sequence initiated.

Pre-pressurise System

The Duty Pump will always be selected; in this case we are making the assumption that the duty pump is [M5a]. Accumulators will always be pressurised individually during the pressurisation sequence.

Process:—

Check that Solenoid valves, [SV88-1], [SV89-2] are de-energised; if they are energised, de-energise.

Check that Solenoid valves, [SV46-a] and [SV46-b] are de-energised; if they are energised, de-energise.

Check that Solenoid valves, [SV48-1] and [SV49-1] are de-energised. This is to remove any residual pressure from the system and for circulation.

Energise Loading solenoid valve [SV20a]. Start Pump [M5a] and de-energise valve [SV20a].

Energise Release solenoid valves [SV30a].

The following tests are performed every 10 seconds during the pressurisation sequence If [PT34d] and [PT34a] do not detect an increase in pressure above 2 Bar within 10 seconds (TBC during commissioning), and high flow seconds (TBC during commissioning) is detected, or a pressure decrease of 5 bar in 10 seconds and high flow seconds (TBC during commissioning) an alarm is triggered 'Major detected or Pump Fault', and a pump stop command is issued. The operator has the option to restart the pressurisation sequence after checking the system.

If the pump has not achieved pressure set-point pressure on sensors PT34a or PT34b and PT34c after 60 seconds this will result in a HMI alarm and re-test prompt Pressurise the system accumulator. Monitor pressure sensors [PT34a] and [PT43a]. When the pressure is above 230 bBar, de-energise [SV30a].

Energise Release solenoid valves [SV30b].

Pressurise the system accumulator. Monitor pressure sensors [PT34b] and [PT43b]. When the pressure is above 230 bBar, de-energise [SV30b].

De-energise valve [SV20a]

Stop Pump [M5a].

The system is now ready for activation. The system will monitor the pressure sensors [PT34a] and [PT34b]. If either of these sensors detect a pressure drop, the duty pump will perform a start sequence and re-pressurise the system.

If the pump is required to re-pressurise the system 4 times within an hour (To be decided during commissioning), an alarm will be generated on the HMI 'Pressure leak on Actuation system'.

ESD-2 Push Button Validation

Pre-test:—

The purpose of this series of tests is to ensure the integrity of all ESD-2 Push Button circuits. The tests will be sequential and each part of the sequence will be shown on the HMI screen. As the buttons are actuated, the actuation will be shown by a change from blue to green. The final push button actuation will initiate an ERC piston stroke thus simulating activation. Tests are sequential and, as such, have no time limit on them. Notification of a sequence step failure will purely be related to the fact that the sequence will not change colour. All push buttons will have to be depressed to complete the sequence.

Process:—

For this test sequence we can assume ESD-2 buttons at LCP-1 and LCP-2 have been tested {Operator actuates [RCP-1] ESD-2 push button and then resets push button}

The sequence is checking for the safety input to change state, and simultaneously checking the short circuit and open circuit fault feedback from the barrier. (This is not expected to change state under normal operation).

If the safety input changes state from True to False, and the fault feedback remains True, the test sequence is passed.

The operator is then prompted to test the ESD-2 located at [LCP-2], and finally the ESD-2 button located at [RCP].

The ESD-2 push buttons are classed as being complementary critical protection. All three of them are required to be active and healthy to complete the proof test process. Failure of an ESD-2 push button test will inhibit the next step of the test process.

ERC Activation

The following sequence is initiated when the operator is prompted to actuate the [RCP] ESD-2 Push button as the final part of the ESD-2 Push button validation process.

The ESD-2 Push button input check sequence is performed; if the outcome of the test is successful an ESD-2 sequence activation is initiated.

The activation test is sequential, testing each ERC individually. The purpose of testing sequentially is to ensure that the correct hydraulic hoses and electrical connectors are connected to the correct ERC, this check is done by monitoring the activation cylinder retract sensor, in the case of ERC-1 this is sensor [23S3(E)]. The test is sequenced with 1000 ms between ERC actuations.

All the feedback is monitored but has no mitigating effect on the ERC release when in activation mode.

During activation the pressure direction is reversed on the ERC return filter; this pressure change may set an alarm on the HMI. The return filter input is only checked during oil circulation and not during activation.

Process:—

Circulating Pump [M6] is Deactivated. The Return to Tank Valves [SV47a] and [SV47b] are energised.

Blocking Valves [SV48-1] and [SV49-1] and [SV46a] and [SV46b] are energised.

Blocking valves [SV30a] and [SV30b] are energised to pressurise the system.

Valves [SV20a] and [SV20b] are de-energised and protected from the system pressure by non-Return Valves.

Energise [SV88-1a] and [SV89-1b].

Feedback is monitored on the piston retracted sensor of ERC-1, CP-3 [23S3 (E)] and Firing pin sensors [21S1 (E)] and [22S1 (E)].

There are several possible alarm conditions:

If piston retracted sensor [23S3 (E)] is False, and Firing pin sensors [21S1 (E)] and [22S1 (E)] are False, the alarm 'ERC-1 Piston unknown Position' is displayed on the HMI.

If the piston retracted sensor [23S3 (E)] is False, the firing pin sensors [21S1 (E)] is true and Sensor [22S1 (E)] is False, the alarm 'ERC-1 sensor conflict' is displayed on the HMI.

If an ERC fails to fire, or the outcome of the test is unsatisfactory, the activation test sequence will cease at the failed sequence step. The operator will be prompted to check the failed ERC hydraulic and electrical connections. The operator will be given the option of restarting a retest. The system will start the Pre-pressure sequence detailed in the 'pre-pressurise system' section before re-starting the test sequence. The test sequence will start automatically and not require an ESD-2 button to be activated.

When the sequence is successful, the system will be ready for automatic operation. If the system is now validated and ready for operation, a popup asking the operator to Accept to re-pressurise the system will be displayed on the HMI screen:

{Operator presses the accept button} this will initiate the automatic sequence

Initialise Automatic Control

The automatic pressurisation sequence described in the 'pre-pressurise system' section is initiated.

The automatic circulation sequence described in the 'start oil circulating pumps' section is initiated.

All heating and Pressure system and Circulating alarms will be active.

When the oil heating circulation sequence is active, the ERC-1 piston will become extended, and the system will see the sensor [23S3 (E)] has become False, indicating the piston is ready to have the firing pins replaced:

A prompt asks the operator to replace the firing pins and press Accept.

{Operator presses accept button}.

Note:

The Accept button will not respond until all pins are correctly in place.

The Firing pin sensors are now active. These alarms will now remain active for the remaining proof test sequences. Sensor out of position alarms will now be displayed on the HMI.

The distance sensor validation sequence is initiated.

Distance Sensor Validation

During proof testing all distance sensors have to be fully operational so only a three out of three pass criteria is acceptable. The incremental value (reset to zero at fully retracted on a previous step) is available for viewing on the HMI screen at any time.

The Distance measurement validation has to be completed before connection of any hoses between ships. In the previous section, we have validated and checked the fully retracted sensor value for [STS1], [STS2] and [STS3]. The zero values when fully retracted were stored within the safety program for future use.

The Operator ensures the sensors are attached to the opposite ship

{Operator presses accept button}—the following sequence checks are performed:

1. The Distance Sensors have to have been extended incrementally greater than 3 meters from the fully retracted value stored in the safety program, described in the 'solenoid position feedback tests I' section, to allow validation to be accepted.
2. The program checks that more than 10 meters of wire remain on the distance sensor encoder, so that actuation is possible.
3. The sensors [STS1 (E)], [STS2 (E)] and [STS3 (E)] must have less than 500 mm of deviation between the extended values when attached to the opposite ship, or an alarm will be generated on the HMI.
4. The current incremental analogue value of the sensors [STS1 (E)], [STS2 (E)] and [STS3 (E)] is stored in the safety program. This value is now stored as the working reference position and will be the basis of all comparison checks between sensors.
5. During the test if any distance sensor fails a validation process, an alarm will be generated and displayed on the HMI.
6. In the case that a sensor fails or becomes unreliable, the operator will be given the option to change the sensor, and then execute the sequences detailed in the 'solenoid position feedback tests I' section immediately, followed by the sequence detailed in the "distance sensor validation' section.

Transfer Activation

The system is now fully tested and validated. Placing the system in transfer mode will inhibit all manual control. All ERC activation will now be the sole function of the Safety Instrumented Functions; these are all active. All process monitoring and control loops will be active.

Process:

When the Distance sensor validation sequence has been completed, the Operative is Prompted to switch [415S2(E)] into the Transfer position, this inhibits any Variable transfer between the Process and Safety software This also enables the Safety instrumented Functions, Automatic (distance Measurement) and Manual (ESD-2 Push buttons), the Safety system is now active and a prompt warning the operator that the ships are now interconnected is displayed:

{Operator switches key switch [415S2] into the Transfer Position}:

Notes:

If an ESD-1 situation exists, the system will immediately go into ESD-1.

ESD-1 cannot be inhibited in Transfer Mode.

The program performs a check of all sensors for fault/out of position conditions; if no faults are found the ESD-1 output to the ship is energised enabling transfer of cargo.

The key is removed from the switch [415S2] to avoid accidental operation during transfer. Changing the Key switch [415S2] from transfer to set up will always result in an ESD-1.

Oil Circulation

ERC-1 solenoid valves [SV48-1] and [SV49-1] are de-energised. This allows the return path to tank.

Solenoid valves [SV47-a] and [SV47-b] are de-energised.

Duty circulation motor is running; in this example [M6].

Check flow feedback on sensor [FI72]. If the flow reduces below the alarm set-point (250 cc) (TBC) during transfer, and the ERC temperature starts to reduce as a result of reduced flow, an alarm will be generated on the HMI and the Standby pump will be started.

This is now an automated sequence and will continue until an alarm is generated. The duty pump will be active for the full duration of the transfer.

The following checks are performed by the system:

Evaluate the temperature of the release mechanism, using sensors [TT01] and [TT02].

Check Temperature deviation between active ERCs. Any deviation above 5° C., generate an alarm.

Check Temperature deviation between sensors [TT01] and [TT02] and [TT04b]. Any deviation above 5° C. generates an alarm.

[TT04a] checks for high and low temperature on the oil tank; this is a safety loop.

Heater safety cut out inputs [18a] and [18b] are monitored by the PLC system.

Activation Pressure System

The system is pressurised from the 'Pre-pressurise system' section. The duty pump will always be selected; in this case we are making the assumption that the duty pump is [M5a].

Process:

The system is ready for activation. The system will monitor the pressure sensors pressure [PT34a] and [PT43a]. If either of these sensors detect a pressure drop, the duty pump will perform a start sequence and re-pressurise the system as described in the 'Pre-pressurise system' section.

Please note the system will only re-pressurise the accumulator that has detected a pressure reduction.

The system is checking for activation and blocking valves out of position.

All contactor and overload feedback inputs are monitored pumps, failure of the duty pump will result in the standby pump starting.

If the pump is required to re-pressurise a particular Accumulator within a pre-set time, nominally one hour (To be decided during commissioning), an alarm will be generated on the HMI 'Pressure leak on Accumulator xxxx'.

Distance Sensors

If the master and slave ships drift apart due to a failure of the mooring system, first an ESD-1 will be initiated at 4 metres drift, followed by ESD-2 timed release initiated at 7 metres drift. In an emergency situation when the drift is over 10 meters before the timed release at 7 meters has been completed, an immediate release will be initiated.

All sensor error checks are active.

Cold Test

The cold test is an active test; great care has to be taken with this test process, as this can and will do a full ERC release if the Firing pins are not removed.

This test must be performed after the cooling process but before the main transfer can commence.

As the test is performed on an active system we cannot inhibit or mask any input or output. This test has to become part of a documented test procedure for the ship.

The release is a full release using both redundant valves, so 46 solenoid valves in total Procedure:

1. Operator presses a ship ESD-1 Push button.
2. Operator checks cargo pumps have stopped.
3. All firing pins are removed from active ERCs.
4. All removed pins will generate an alarm on the HMI; the operator accepts the alarms.
5. Operator activates any ERC-2 Push button (Generally sequenced within the test procedure).

Process:
Circulating Pump [M6] is deactivated. Return to Tank Valves [SV47a] and [SV47b] are energised.

Blocking Valves [SV48-1] and [SV49-1] and [SV46a] and [SV46b] are energised.

Blocking valves [SV30a] and [SV30b] are energised to pressurise the system.

Valves [SV20a] and [SV20b] are de-energised and protected from the system pressure by non-return valves.

Energise [SV88-1a] and [SV89-1b].

Feedback is monitored on the piston retracted sensor of ERC-1, CP-3 [23S3 (E)] and Firing pin sensors [22S1 (E)] and [22S2 (E)].

After an activation a prompt is displayed on the HMI, whereby the prompt warns the operator that the system has been activated and asks the operator whether he wishes to re-arm the system.

{Operator presses accept button}—the following sequence checks are performed:

The automatic pressurisation sequence described in the 'Pre-pressurise system' section is initiated.

The automatic circulation sequence described in the 'start oil circulating pumps' section' is initiated.

All heating and Pressure system and Circulating control loops will be active.

When the oil heating circulation sequence is active the ERC-1 piston will become extended. The system will see the sensor [23S3 (E)] has become False, indicating that the piston is ready to have the firing pins replaced.

The operator can now replace the firing pins, the system cannot be made active until all firing pins have been replaced.

The program performs a check of all sensors for fault/out of position conditions, if no faults are found a prompt confirming that the system is ready is displayed on the screen.

{Operator presses accept button} ESD-1 output to the ship is energised enabling transfer of cargo.

End Transfer

When the transfer of LNG has concluded and the transfer hose system has gone through the 'Warm Up' process, The transfer hoses must be removed before the system is deactivated. This step is initiated by the Transfer Control room supervisor.

After the hoses are removed, the Firing pins will be removed from the active ERCs, for which pin missing alarms will be displayed on the HMI.

The system cannot now be deactivated.

Transfer to Proof Test Process

The system is disarmed by simply switching the key switch [415S2] into the Proof Test z position. This will de-energise all valves and switch off all Pumps and heaters and send a ESD-1 signal to the ship The operator will be presented with a prompt asking whether he wants to continue to a proof test, and is given the buttons Yes and No.

Operator Presses Yes Button

If the operator presses the No button the sequence in the following section below will occur.

The system will reset all 'Out of Service' items of equipment.

The system is now in an ESD-1 condition; the output can only be reset by completing a Proof Test sequence.

A prompt appears, warning the operator that the system is de-activated and the hydraulic hoses can be disconnected.

The Distance sensors can now be disconnected from the ship.

When the distance sensors [STS-1] [STS-2] and [STS-3] are reset to the home position, or disconnected, the warning pop up will reset.

The sequence will be reset to the 'initial validation' section.

Operator Presses No Button

When the operator presses the No button, a further prompt appears, asking the operator to place the Key-switch 415S2 into the transfer position and press Accept.

Operator switches the Key-switch 415S2 into the transfer position and presses the ACCEPT button.

The system checks all the firing pins are in the correct position and the Oil and ERC temperatures are satisfactory, after the checks are completed the system executes the following steps:

The automatic pressurisation sequence described in the 'Pre-pressurise system' section is initiated.

The automatic circulation sequence described in the 'start oil circulating pumps' section' is initiated.

All heating and Pressure system and Circulating control loops will be active.

When the system is ready and active the ESD-1 to the ship is removed.

This end transfer process is performed whenever the key-switch is changed from Transfer to Proof Test when the transfer has been active; if the transfer has not been active the system will remain in Proof Test.

The purpose of the test is to avoid the accidental implementation of a Full Proof Test sequence mid transfer.

If the system is to be not used for a period of time (dry dock), it is recommended that the system is de-pressurised. This is accomplished by the use of manual valves and will be detailed in the IOM.

The invention claimed is:

1. An assembly for transferring matter between first and second objects separated by a distance, either or both of the first and second objects being movable to increase or decrease the distance therebetween, the assembly comprising:

a conduit providing a medium for transferring matter between the first and second objects, the conduit comprising first and second conduit sections, the first conduit section being operatively connectable to the first object, the second conduit section being operatively connectable to the second object;

an emergency release system including an emergency release coupling, the emergency release coupling including first and second coupling portions, the first coupling portion operatively coupled to the first conduit section, the second coupling portion operatively coupled to the second conduit section, the first and second coupling portions configured to be selectively connectable and separable to permit selective coupling and separation of the first and second conduit sections; and a diagnostic system programmed to perform a proof test to assess the operational capability of the emergency release system prior to the operation of the conduit to transfer matter between the first and second objects;

wherein the emergency release system is maintained, during the proof test, in a first safe state to de-energise the emergency release coupling in order to prevent separation of the first and second coupling sections from each other.

2. An assembly according to claim 1 wherein the diagnostic system is programmed to perform the proof test to assess the operational capability of the emergency release system prior to each of a plurality of operations of the conduit to transfer matter between the first and second objects.

3. An assembly according to claim 1 wherein the first safe state includes one or more of:
de-energisation of a power source configured to enable charging of a stored energy source for an actuator operable to initiate the separation of the first and second coupling portions;
de-energisation of a heating system arranged to control a temperature of the emergency release coupling;
de-energisation of one or more solenoid valves switchable to control the operation of the emergency release system;
maintaining the stored energy source in a fully charged state, wherein the stored energy source is for an actuator operable to initiate the separation of the first and second coupling portions;
maintaining closed an activation element, which is switchable to open to initiate the separation of the first and second coupling portions;
maintaining open a blocking element, which is switchable to close to configure the first and second coupling portions to block the flow of matter therethrough.

4. An assembly according to claim 1 wherein the proof test includes one or more of:
a test of an actuator to simulate the separation of the first and second coupling portions, wherein the actuator is normally operable to initiate the separation of the first and second coupling portions but configured during the proof test to inhibit actual separation of the first and second coupling portions;
a test of the integrity and/or status of one or more solenoid valves switchable to control the operation of the emergency release system;
a test of the status of at least one distance sensor configured to measure, in use, the distance between the first and second objects;
a test of the status of at least one sensor configured to measure a property of the emergency release system;
a test of the status of a heating system arranged to control a temperature of the emergency release coupling;
a test of the status of a stored energy source for the actuator operable to initiate the separation of the first and second coupling portions;
a test of the status of a pump configured to charge the stored energy source for the actuator operable to initiate the separation of the first and second coupling portions;
a test of the integrity and/or status of a control system programmed to operate the emergency release system.

5. An assembly for transferring matter between first and second objects separated by a distance, either or both of the first and second objects being movable to increase or decrease the distance therebetween, the assembly comprising:
a conduit providing a medium for transferring matter between the first and second objects, the conduit comprising first and second conduit sections, the first conduit section being operatively connectable to the first object, the second conduit section being operatively connectable to the second object;
an emergency release coupling including first and second coupling portions, the first coupling portion operatively coupled to the first conduit section, the second coupling portion operatively coupled to the second conduit section, the first and second coupling portions configured to be selectively connectable and separable to permit selective coupling and separation of the first and second conduit sections; and
a safety instrumented function including a sensor, a logic solver and a final element, the final element being in the form of the emergency release coupling, wherein the logic solver is programmed to activate the final element in response to detection of a fault that inhibits the operation of the conduit to safely transfer matter between the first and second objects so as to:
initiate a first safe state to de-energise the emergency release coupling in order to prevent separation of the first and second coupling portions from each other; or
initiate a second safe state to cause separation of the first and second coupling portions.

6. An assembly according to claim 5 wherein the first safe state includes one or more of:
de-energisation of a power source configured to enable charging of a stored energy source for an actuator operable to initiate the separation of the first and second coupling portions;
de-energisation of a heating system arranged to control a temperature of the emergency release coupling;
de-energisation of one or more solenoid valves switchable to control the operation of the emergency release coupling;
maintaining the stored energy source in a fully charged state, wherein the stored energy source is for the actuator operable to initiate the separation of the first and second coupling portions;
maintaining closed an activation element, which is switchable to open to initiate the separation of the first and second coupling portions;
maintaining open a blocking element, which is switchable to close to configure the first and second coupling portions to block the flow of matter therethrough.

7. An assembly according to claim 5 wherein the logic solver is programmed to selectively activate the final element to initiate the second safe state after the first safe state is initiated.

8. An assembly according to claim 7 wherein the logic solver is programmed to selectively activate the final element to initiate the second safe state following a time delay after the first safe state is initiated.

9. An assembly according to claim 5 wherein the sensor is a distance sensor configured to measure, in use, the distance between the first and second objects, and the fault includes the distance between the first and second objects exceeding a predefined safety distance threshold.

10. An assembly according to claim 9 wherein the logic solver is programmed to selectively activate the final element to: initiate the first safe state when the distance between the first and second objects exceeds a first safety distance threshold; and initiate the second safe state to cause separation of the first and second coupling portions after the first safe state is initiated and when the distance between the first and second objects exceeds a second safety distance threshold that is larger than the first safety distance threshold.

11. An assembly according to claim 5 wherein the safety instrumented function is configured to permit initiation of the second safe state on demand independently of the sensor.

12. An assembly according to claim 5 wherein the fault includes one or more of:
the failure or fault operating condition of an assembly component;

the failure or fault operating condition of each of a plurality of assembly components arranged in a redundant configuration.

13. An assembly according to claim 5 wherein the fault includes one or more of:
    the failure or fault operating condition of one or more of a plurality of assembly components arranged in a redundant configuration;
    the failure or fault operating condition of the majority of a plurality of assembly components arranged in a redundant configuration.

14. An assembly according to claim 13 wherein the or each assembly component is or includes:
    the emergency release coupling;
    the sensor;
    a power supply configured to power an assembly component;
    a stored energy source for an actuator operable to initiate the separation of the first and second coupling portions;
    a pump configured to charge the stored energy source for the actuator operable to initiate the separation of the first and second coupling portions;
    a heating system arranged to control a temperature of the emergency release coupling;
    a control system programmed to monitor and/or operate the emergency release coupling.

* * * * *